(12) United States Patent
Inoue et al.

(10) Patent No.: US 7,999,838 B2
(45) Date of Patent: *Aug. 16, 2011

(54) LINE HEAD, IMAGE FORMING APPARATUS INCORPORATING THE SAME, AND METHOD OF ADJUSTING POSITION OF THE SAME

(75) Inventors: Nozomu Inoue, Matsumoto (JP); Kiyoshi Tsujino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 118 days.

This patent is subject to a terminal disclaimer.

(21) Appl. No.: 12/364,347

(22) Filed: Feb. 2, 2009

(65) Prior Publication Data

US 2009/0141115 A1    Jun. 4, 2009

Related U.S. Application Data

(63) Continuation of application No. 11/530,786, filed on Sep. 11, 2006, now Pat. No. 7,505,059.

(30) Foreign Application Priority Data

| Sep. 12, 2005 | (JP) | ................. | 2005-263273 |
| Sep. 12, 2005 | (JP) | ................. | 2005-263274 |
| Sep. 13, 2005 | (JP) | ................. | 2005-264629 |

(51) Int. Cl.
B41J 2/45 (2006.01)

(52) U.S. Cl. .......................................... 347/238

(58) Field of Classification Search .................. 347/238, 347/241, 242, 244, 256–258, 229, 234, 248
See application file for complete search history.

(56) References Cited

U.S. PATENT DOCUMENTS

| 4,821,051 A | 4/1989 | Hediger | ..................... 347/130 |
| 5,309,182 A | 5/1994 | Mama et al. | |
| 5,612,767 A | 3/1997 | Iwama | |
| 6,995,782 B2 | 2/2006 | Oda et al. | ..................... 347/138 |
| 7,505,059 B2 * | 3/2009 | Inoue et al. | ..................... 347/238 |
| 2004/0135875 A1 * | 7/2004 | Wakisaka | ..................... 347/238 |

FOREIGN PATENT DOCUMENTS

| JP | 04-166824 | | 6/1992 |
| JP | 05084972 | A | 4/1993 |
| JP | 05309877 | A | 11/1993 |
| JP | 07-311495 | | 11/1995 |
| JP | 09052385 | A | 2/1997 |
| JP | 09226168 | A | 9/1997 |
| JP | 10-016294 | | 1/1998 |
| JP | 10016295 | A | 1/1998 |
| JP | 10-073980 | | 3/1998 |
| JP | 2000335001 | A | 12/2000 |
| JP | 2002-337392 | | 11/2002 |
| JP | 2002337392 | A * | 11/2002 |

* cited by examiner

*Primary Examiner* — Hai C Pham

(74) *Attorney, Agent, or Firm* — DLA Piper LLP (US)

(57) ABSTRACT

In a line head, a plurality of light emitters are arrayed on a substrate in a first direction. Each of the light emitters is operable to emit a light beam. In a rod lens array, a plurality of rod lenses are arrayed in the first direction, and each of the rod lenses is adapted to focus the light beam emitted from an associated one of the light emitters onto a target surface. The substrate and the rod lens array are attached to a holder elongated in the first direction. Positioning members are provided at both end portions of the holder in the first direction. A relative position between the substrate and at least one of the positioning members is variable in a second direction perpendicular to the first direction.

14 Claims, 18 Drawing Sheets

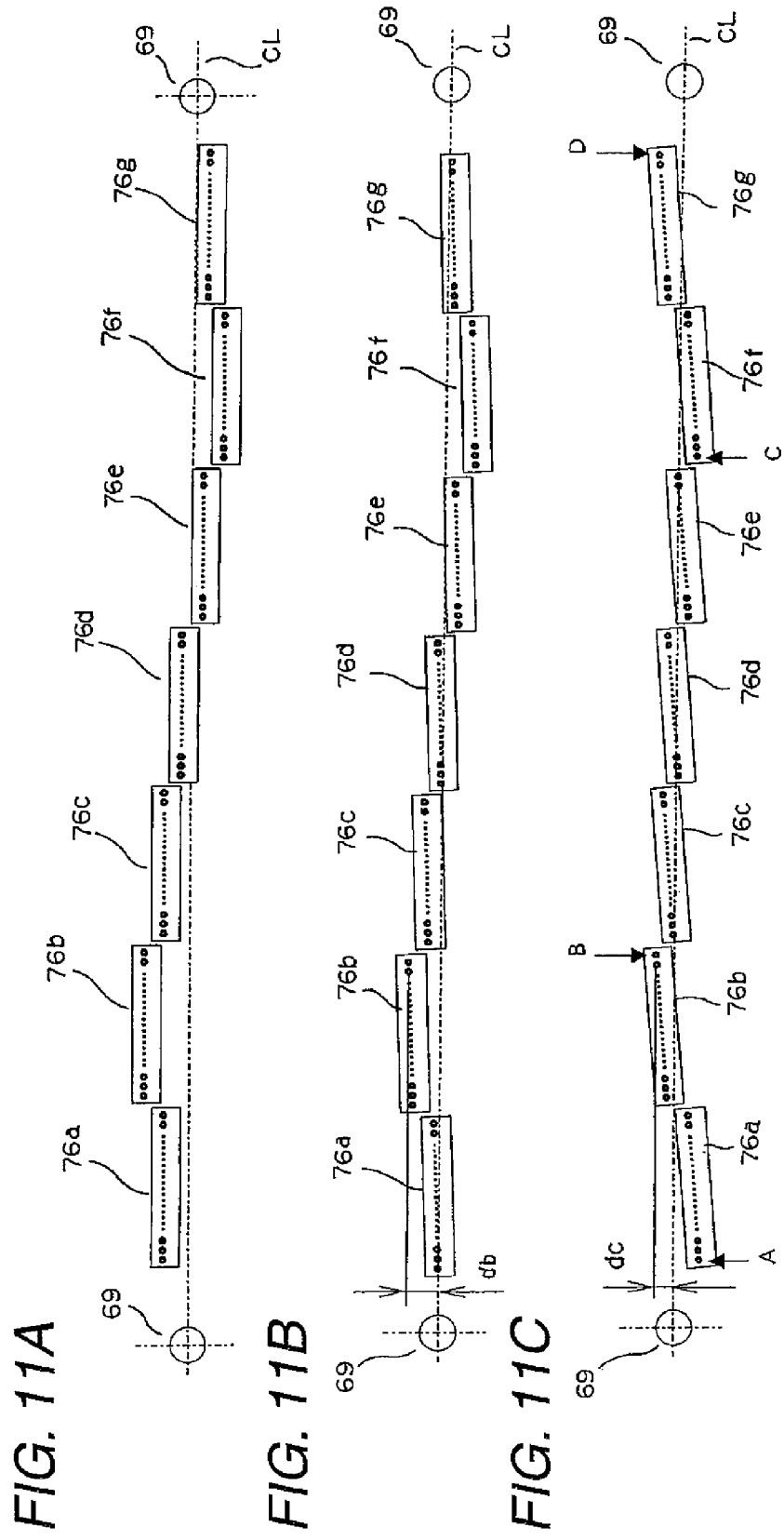

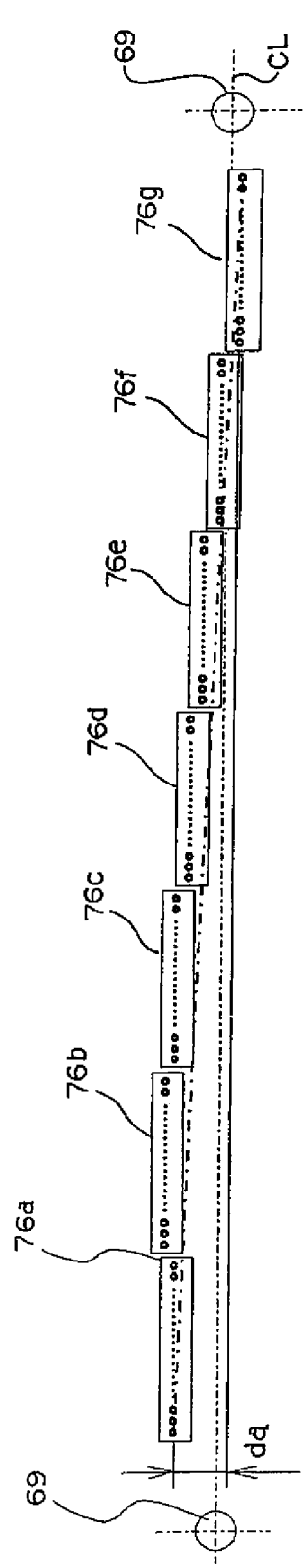
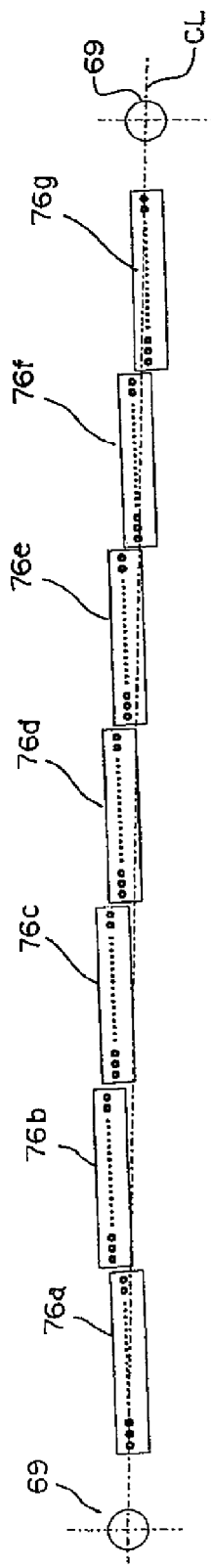

LINE HEAD, IMAGE FORMING APPARATUS INCORPORATING THE SAME, AND METHOD OF ADJUSTING POSITION OF THE SAME

CROSS-REFERENCE TO THE RELATED APPLICATIONS

This application is a continuation of application Ser. No. 11/530,786 filed Sep. 11, 2006 now U.S. Pat. No. 7,505,059, the entire contents of which are incorporated herein by reference. This application also claims the benefit of priority under 35 U.S.C. §119 to Japanese Patent Application No. 2005-263273 filed Sep. 12, 2005, Japanese Patent Application No. 2005-263274 filed Sep. 12, 2005 and Japanese Patent Application No. 2005-264629 filed Sep. 13, 2005, the entire contents of all of which are incorporated herein by reference.

BACKGROUND

1. Technical Field

The present invention relates to a line head, an image forming apparatus using the line head, and a method for adjusting the position of the line head.

2. Related Art

In general, a toner image former using an electrophotography technique comprises a photosensitive member which has, on an outer peripheral face thereof, a photosensitive layer which serves as an image carrier; a charger for uniformly charging the outer peripheral face of the photosensitive member; an exposer which selectively exposes the outer peripheral face uniformly charged by the charger, to thus produce an electrostatic latent image; and a developer for imparting toner serving as a developing agent to the electrostatic latent image produced by the exposer, thereby transforming the electrostatic latent image into a visible image (a toner image).

In a tandem-type image forming apparatus for producing a color image, the toner image former is disposed in numbers (e.g., four) in relation to an intermediate transfer belt. Respective toner images produced on the photosensitive member by toner image former of single colors are sequentially transferred onto the intermediate transfer belt, whereby toner images of a plurality of colors (e.g., yellow, cyan, magenta, black) are overprinted one on the other on the intermediate transfer belt, to thus produce a color image on the intermediate transfer belt.

In such a tandem-type image forming apparatus, as a light emitter in the exposer, a line head using an LED or an organic EL element is used. When a process cartridge removably attached to the line head is adopted, difficulty is encountered in direct positioning of the shaft of the photosensitive member with respect to a main body of the image forming apparatus if the removable attachment direction is parallel to the direction of the shaft of the photosensitive member.

When the structure of such a removable process cartridge is adopted, the parallelism of the shaft of each of the photosensitive members varies from a cartridge of one color to a cartridge of another color. In the tandem color image forming apparatus, even when scan lines to be written are accurately parallel to each other, if the shaft of the photosensitive member is inclined, the scan lines become nonparallel at a point in time when the image written in the photosensitive member is developed and transferred to an intermediate transfer belt. Namely, skewing arises, which in turn creates misregistration of colors.

In addition, variations in the reference position where the cartridge is attached to the main body also cause an error in the parallelism of each of the color cartridges. The parallelism of the photosensitive member attached to the cartridge is impaired by such an error in parallelism, thereby causing a skew in the same manner as mentioned above. Since the misregistration of colors causes deterioration of image quality, measures must be taken to prevent occurrence of skewing.

However, in the tandem color-image forming apparatus using the line head, it is very difficult to maintain parallelism between respective scan lines to be transferred to an intermediate transfer belt by only an improvement in mechanical accuracy of individual sections. To cope with such a problem, Japanese Patent Publication No. 4-166824A (JP-A-4-166824) discloses a mechanism for adjusting positions of the line head in three axial directions as well as adjusting attitudes of the line head around three axes.

Japanese Patent Publication No. 10-73980A (JP-A-10-73980) discloses a tandem-type image forming apparatus performing a method for dividing writing operation of a line head into several sub-operations and sequentially delaying writing timings of the writing operations to thus electrically correct skews of respective colors. Japanese Patent Publication No. 10-16294A (JP-A-10-16294) discloses a mechanism which adjusts both ends of a member supporting an LED array in a secondary scanning direction with respect to a graded-index lens array (Selfoc Lens Array). Japanese Patent Publication No. 2002-337392A (JP-A-2002-337392) discloses a mechanism for adjusting the position of a substrate provided with a light emitter with respect to a main body of the line head:

Incidentally, in a line head using, as a light emitter, an organic EL element or an LED, the line head is positioned by inserting, into a cartridge, reference pins provided on the respective ends of the line head. In the case of a line head using an LED, the line head may be attached to the main body of the image forming apparatus. A line head using an LED generally employs a plurality of LED array chips, each of which is formed by integrating tens to 200 light emitting elements, and the LED array chips are mounted on a substrate, thereby producing a head of predetermined length.

In the line head of such a configuration, a line (scan line) formed by arranging in a row the light emitting elements of the respective LED array chips is curved by a positional error caused at the time of mounting of the LED array chips. In order to focus the light beams emitting from the LED array chips into an image on a plane to be scanned (hereinafter simply called a "scanned plane"), a rod lens array is provided. This rod lens array exhibits the action of projecting, in an erecting manner, the light beams from the light source onto the scanned plane at the same magnification.

Accordingly, the layout of the light sources is projected, without modification, onto the scanned plane even when errors are present. When the LED array chips are mounted in a curved manner as mentioned above, the arrangement of an image spot formed by converging light beams from the LED array chips is also curved in the same manner. In short, an image is displaced in the secondary scanning direction.

Correction of an error in the LED array chips in the secondary scanning direction will be described. In FIGS. 18A and 18B, reference numeral 69 designates reference pins provided on both ends of the line head in the primary scanning direction thereof; and reference symbol CL designates a line connecting reference pins provided on respective ends of the line head and corresponds to a center line of the line head in the primary scanning direction. Reference numerals 76a to 76g designate LED array chips which are to be arranged in numbers in the primary scanning direction of the line head. Each of the LED array chips is provided with a plurality of LEDs.

When the arrangement of each of the LED array chips in a secondary scanning direction has a positional error, a correction value is determined from the amount of displacement of a reference line, which is defined by connecting both end points of the head of that value, by reference to the pixel in the center of the LED array chip or an average value of positional data at both ends of the LED array chip as shown in FIG. 18B. However, when the positional error is corrected by such a method, there may arise a case that a step "da" at the boundary between the LED array chips is extended further as shown in FIG. 18A. Particularly, when the amount of correction in the secondary scanning direction can assume only a discrete value, the step tends to be extended further.

Even when the line head has been accurately adjusted in three axial directions by the adjustment mechanism, such as that described in JP-A-4-166824, if the inclination of an exposure position (a scan line) with respect to the reference (e.g., a reference pin) used for attachment of the line head varies from one line head to another, there arises a problem of the necessity for performing re-adjustment at the time of replacement of the line head.

As described in JP-A-10-73980, the inclination can be corrected (skew correction control) by electrically shifting a writing timing. However, when a skew is corrected by reference to only an initial value, the initial value is changed at the time of replacement of the line head, and hence there arises a necessity for correcting a skew correction value as in the case of JP-A-4-166824.

In order to avoid such complicated processing, a sensor may be provided on each end of the intermediate transfer member, to thus detect the position (inclination) of each of color images and automatically correct the detected inclination. However, a sensor for this purpose is required to be placed in at least two positions; namely, both ends of the intermediate transfer member. This leads to a problem of a complicated structure and a cost hike.

In order to control such skew correction, circuitry of a considerable scale, such as circuitry for changing the sequence of transfer of image data, is required, which in turn raises a problem of excessive cost. Moreover, even in a case where skew correction is performed, when variations in the inclination of the location, where the line head is to be exposed, are great, the range of skew correction control is increased. This raises a problem of an increase in the volume of temporary storage memory required to perform skew correction.

The technique described in JP-A-10-16294 is for adjusting the member supporting an LED with respect to the lens array and not for adjusting the inclination of an image forming position with respect to the line head mount reference section. Likewise, the technique described in JP-2002-337392 is to adjust the substrate having light emitters mounted thereon in the secondary scanning direction. The technique also describes adjustment of the position of the substrate with respect to a lens array, and JP-2002-337392 does not refer at all to adjustment of the line head attachment reference position. Therefore, the techniques described in JP-A-10-16294 and JP-2002-337392 encounter a problem of difficulty in preventing occurrence of skewing and misregistration of colors. Moreover, the techniques described in Patent JP-A-10-16294 and JP-2002-337392 relate to a mechanism for simultaneously adjusting an absolute value of the position in the secondary scanning direction and an inclination. Hence, there arises a problem of involvement of a complicated structure and laborious adjustment work.

When a large step exists in a boundary between the LED array chips as shown in FIG. 18A, a discrepancy between images arises along the step. Accordingly, when a gray-scale image is expressed in halftone dots or oblique lines, a difference in density arises along the step. When the step is large, there arises a problem of a step appearing in an image which should originally be straight.

SUMMARY

One of advantages attained by the invention is to provide a line head capable of effecting skew correction simply, an image forming apparatus using such a line head, and a method for adjusting the position of such a line head.

According to one aspect of the invention, there is provided a line head, comprising:

a substrate;

a plurality of light emitters, arrayed on the substrate in a first direction, each of which is operable to emit a light beam;

a rod lens array, in which a plurality of rod lenses are arrayed in the first direction, and each of the rod lenses is adapted to focus the light beam emitted from an associated one of the light emitters onto a target surface;

a holder, to which the substrate and the rod lens array are attached, the holder being elongated in the first direction; and positioning members, provided at both end portions of the holder in the first direction, wherein:

a relative position between the substrate and at least one of the positioning members is variable in a second direction perpendicular to the first direction.

The substrate may be movable with respect to the holder.

The at least one of the positioning members may be movable with respect to the holder.

The light emitters may be organic EL elements.

The light emitters may be LEDs. A plurality of LED array chips each of which is provided with the LEDs arrayed in the first direction may be arrayed on the substrate in the first direction.

According to one aspect of the invention, there is also provided an image forming apparatus, comprising the above line head, wherein:

the target surface is a surface of an image carrier having a cylindrical body configured to be rotatable;

the line head is operable to expose the surface with the light beam emitted from each of the light emitters, thereby forming an electrostatic latent image thereon; and the first direction is parallel to an axial direction of the cylindrical body, and the second direction is a direction that the cylindrical body rotates.

According to one aspect of the invention, there is also provided a method of adjusting a position of the above line head, comprising:

observing focused light spots formed by light beams emitted from at least two of the light emitters, thereby defining a first line connecting the focused light spots;

defining a second line connecting the positioning members; and varying the relative position between the substrate and the at least one of the positioning members such that the first line is made parallel with the second line.

The method may further comprise integrating the substrate and the holder before the relative position varying is performed.

The method may further comprise integrating the substrate and the holder after the relative position varying is performed.

The method may further comprise adjusting a relative position between the holder and the at least one of the positioning members.

The focused light spots may be formed by the light beams emitted from the light emitters located at both end portions of the substrate in the first direction.

A first one of the focused light spots may be formed by the light beam emitted from one of the light emitters located furthest from the second line in the second direction at one side of the second line. A second one of the focused light spots may be formed by the light beam emitted from one of the light emitters located furthest from the second line in the second direction at the other side of the second line.

BRIEF DESCRIPTION OF THE DRAWINGS

The invention will be described with reference to the accompanying drawings, wherein like numbers reference like elements.

FIG. 5A is a schematic section view for explaining how to adjust the position of the line head, relative to the primary scanning direction.

FIGS. 11A to 11C are diagrams for explaining how to perform the position adjustment of the line head, in a case where the line head incorporates LED arrays.

FIGS. 18A and 18B are diagrams for explaining a problem occurred in a related-art configuration.

DESCRIPTION OF EXEMPLARY EMBODIMENTS

Figure 1:
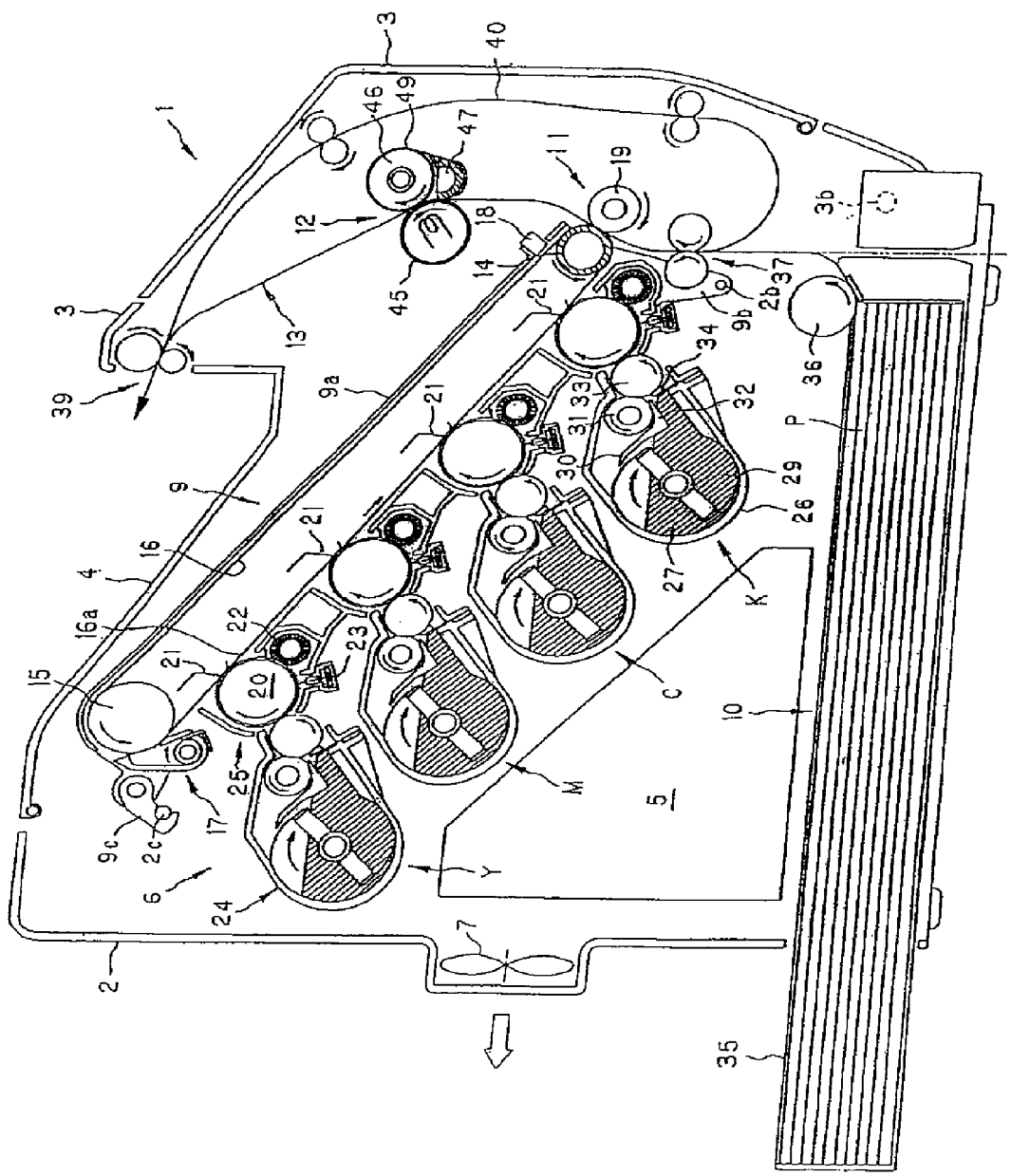
FIG. 1 is a schematic section view of an image forming apparatus incorporating a line head according to a first embodiment of the invention.

FIG. 1 shows an image forming apparatus using a line head according to a first embodiment of the present invention. In the present embodiment, an LED is used as a light emitter. An organic EL element may also be used as the light emitter. In this image forming apparatus, four LED-array exposing heads (or organic EL-element-array exposure heads) of similar configurations are arranged at exposure positions of four corresponding photosensitive drums (image carriers) of similar configurations. The image forming apparatus is configured as a tandem-type image forming apparatus.

An image forming apparatus 1 of the present embodiment shown in FIG. 1 comprises a housing main body 2; a first door cover member 3 attached to the front face of the housing main body 2; and a second door cover member 4 (also serving as a sheet ejecting tray) attached to the upper face of the housing main body 2. Moreover, the first door cover member 3 has a door 3' attached to the front face of the housing main body 2. The door 3' can be opened or closed in cooperation with or independently of the first door cover member 3.

An electrical equipment box 5 housing a power circuit board and a control circuit board, an image forming unit 6, an air-blowing fan 7, a transfer belt unit 9, and a sheet feeding unit 10 are provided in the housing main body 2. A secondary transfer unit 11, a fuser unit 12, and a medium transporter 13 are provided in the first door cover member 3. Consumables in the image forming unit 6 and those in the sheet feeding unit 10 are configured so as to be removably attached to the main body. In this case, the box, the fan, and the units, including the transfer belt unit 9, are configured so as to be removed for repair or replacement.

The first door cover member 3 is attached to the housing main body 2 by way of pivotal shafts 3b provided on respective sides of front lower portions of the housing main body 2. In the present embodiment, removal and attachment of the respective units are enabled by an access solely from the front face of the apparatus, so that the image forming apparatus can be placed in a room in a compact manner. The transfer belt unit 9 comprises a drive roller 14 which is provided at a lower position of the housing main body 2 and is rotationally driven by an unillustrated drive source; a follower roller 15 disposed obliquely upward of the drive roller 14; an intermediate transfer belt 16 which is expanded between the rollers 14, 15 and is driven in a circulating manner in the direction of an arrow; and a cleaner 17 which is retractably brought into contact with the surface of the intermediate transfer belt 16.

The drive roller 14 and the follower roller 15 are rotatably supported by a support frame 9a, and a pivotable section 9b is formed at a lower end of the support frame 9a. This pivotal section 9b is fitted to a pivotal shaft (pivot) 2b provided on the housing main body 2, whereby the support frame 9a is attached to the housing main body 2 in a pivotal manner.

A lock lever 9c is pivotally provided at the upper end of the support frame 9a, and the lock lever 9c can be latched by a latch shaft 2c provided on the housing main body 2. The drive roller 14 also serves as a backup roller of the secondary transfer roller 19 constituting the secondary transfer unit 11. The follower roller 15 also serves as a backup roller of the cleaner 17. The cleaner 17 is provided so as to face a belt face 16a of the intermediate transfer belt 16 oriented downwardly with respect to the transporting direction thereof. A primary transfer member 21 formed from a leaf spring electrode is brought into contact, by elastic force of the primary transfer member 21, with the back face of the belt face 16a of the intermediate transfer belt 16 oriented downwardly with respect to the transporting direction thereof, so as to oppose image carriers 20 of Y, M, C, and K image forming stations to be described later. A transfer bias is applied to the primary transfer member 21.

A test pattern sensor 18 is provided on the support frame 9a of the transfer belt unit 9 in close proximity to the drive roller 14. This test pattern sensor 18 is a sensor for positioning respective color toner images on the intermediate transfer belt 16; detecting the density of each of the color toner images; and correcting the density of each of color images. Although omitted from the drawings, a sensor used for detecting a registration pattern is provided at an appropriate position opposite the intermediate transfer belt 16.

The image forming unit 6 has an image forming station Y (for a yellow color), an image forming station M (for a magenta color), an image forming station C (for a cyan color), and an image forming station K (for a black color), all of which form images of a plurality of different colors (four colors in the present embodiment). Each of the image forming stations Y, M, C, and K comprises the image carrier 20 formed from a photosensitive drum; and a charger 22, an image writer (a line head) 23, and a developer 24, all of which are provided around the image carrier 20. Only the image forming station Y is provided with an illustration of the charger 22, that of the image writer 23, and that of the developer 24. Since the other image forming stations are identical in structure with the image forming station Y, the illustrations are omitted. The order of arrangement of the image forming stations Y, M, C, and K is arbitrary.

The image carriers 20 of the respective image forming stations Y, M, C, and K are brought into contact with the belt face 16a of the intermediate transfer belt 16 oriented downwardly with respect to the transporting direction thereof. Consequently, the image forming stations Y, M, C, and K are arranged in a direction which is tilted leftward with respect to the drive roller 14 in the drawing. As illustrated by an arrow, the image carriers 20 are rotationally driven in the circulating direction of the intermediate transfer belt 16. The charger 22 comprises a conductive brush roller connected to a high-voltage generation source. The outer periphery of a brush rotates with respect to, while remaining in contact with, the image carrier 20 serving as a photosensitive member, at a circumferential speed which is double or triple the circumferential speed of the image carrier 20 as well as in a direction opposite the rotating direction of the image carrier 20. Thus, the face of the image carrier 20 is uniformly charged.

As will be described later, the image writer 23 uses an LED array arranged along the direction of the shaft of the image carrier 20. An organic LED element array in which organic EL elements are arrayed along the direction of the shaft of the image carrier 20 may be used in place of the LED array. The line head using the LED array or the organic EL element array is compact; and has an optical path length which is shorter than that of a laser scanning optical system. The line head has an advantage of the capability of being disposed in close proximity to the image carrier 20 and downsizing the overall image forming apparatus. In the present embodiment, the image carrier 20, the charger 22, and the image writer 23 of each of the image forming stations Y, M, C, and K are integrated into a single image carrier unit 25. The image carrier unit can be replaced with respect to the support frame 9a, along with the transfer belt unit 9.

Next, details on the developer 24 will be described by taking the image forming station K as an example. In the present embodiment, the image forming stations Y, M, C, and K are arranged obliquely, and the image carriers 20 are brought into contact with the belt face 16a of the intermediate transfer belt 16 oriented downwardly in the circulating direction thereof. In view of this positional relationship, a toner container 26 is disposed at an angle in an obliquely downward position. For this reason, the developer 24 adopts a special structure. Specifically, the developer 24 has the toner container 26 for storing toner (a hatched portion in the drawing); a toner storage section 27 formed in the toner container 26; a toner agitator 29 provided in the toner storage section 27; and a partition member 30 formed in an upper portion of the toner storage section 27.

Further, the developer 24 is further provided with a toner supplying member 31 disposed at a position above the partition member 30; a blade 32 which is provided on the partition member 30 and brought into contact with the toner supplying member 31; a development roller 33 disposed so as to contact the toner supplying member 31 and the image carrier 20; and a control blade 34 brought into contact with the development roller 33. The image carrier 20 is rotated in the circulating direction of the intermediate transfer belt 16. The development roller 33 and the feed roller 31 are rotationally driven in the direction opposite the rotating direction of the image carrier 20 as indicated by the arrow in the drawing. The agitator 29 is rotationally driven in a direction opposite the rotating direction of the feed roller 31.

The sheet feeding unit 10 has a sheet feeding section comprising a sheet feeding cassette 35 where recording media P are held in a stacked manner and a pickup roller 36 for feeding the recording medium P from the sheet feeding cassette 35 one at a time. A pair of registration rollers 37 used for determining a timing at which the recording medium P is fed to a secondary transfer section. The secondary transfer unit 11 to be brought into compressed contact with the drive roller 14 and the intermediate transfer belt 16; the fuser unit 12; the medium transporter 13; a pair of sheet ejecting rollers 39; and a duplex print sheet transport path 40 are provided within the first door cover member 3.

The fuser unit 12 has a heating roller 45 which incorporates a heat-producing element, such as a halogen heater, and is rotatable; a press roller 46 for pressing the heating roller 45; a belt expander 47 being swayable relative to the press roller 46; and a heat-resistant belt 49 expanded between the press roller 46 and the belt expander 47. A color image secondarily transferred to a recording medium is fused with a predetermined temperature at a nip section formed by the heating roller 45 and the heat-resistant belt 49.

As shown in FIG. 1, in the image forming apparatus of the present invention, the development section causes developing agents of respective colors (toner) to adhere to electrostatic latent images written by four line heads. The toner images are then transferred to the intermediate transfer member, whereupon the four toner images are overprinted on each other. A process cartridge is a consumable and is configured so as to be removably attached by the user.

Figure 2:
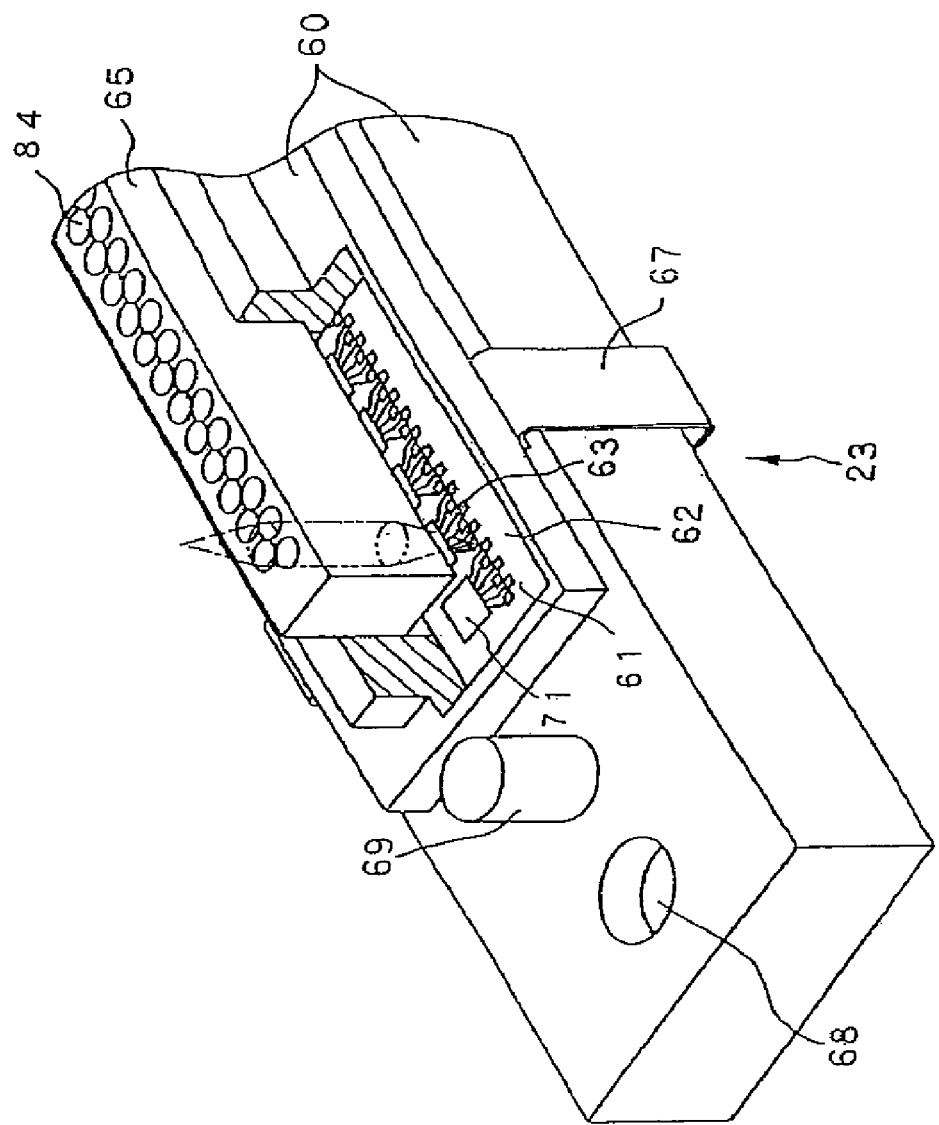
FIG. 2 is a partial perspective view of the line head.

FIG. 2 shows the image writer (the line head) 23 in an enlarged manner. An LED array 61 is held in an elongated housing (holder) 60. Reference pins 69 provided on both ends of the holder 60 are fitted into mating positioning holes of a casing. Further, fastening screws are inserted into and fastened to tapped holes of the mating casing via holes 68 formed in both ends of the holder 60, whereby the respective image writer 23 are fixed to predetermined positions.

In the image writer 23, light emitters 63 of the LED array 61 are provided on a substrate 62 and driven by drive circuits 71 formed on the same substrate 62. In the image writer 23 employed when the organic EL element is used, a glass substrate is used as a substrate, and the light emitters (organic EL elements) 63 of the organic EL element array 61 are placed on the glass substrate 62 and driven by the drive circuits 71 formed on the same glass substrate 62. A graded-index rod lens array (Selfoc Lens Array; SLA; trademark owned by Nippon Sheet Glass Co., Ltd.) 65 forms an image forming optical system, and graded-index rod lenses 84 arranged in front of the light emitters 63 are formed in a staggered pattern. Light beams emitted from the light emitting elements of the LED chips are focused on the scanned plane in an erecting manner at the same magnification by the SLA 65.

In a case where the organic EL element is used, since the organic EL elements 63 are arranged on the glass substrate 62, the image carrier can be irradiated without loss of the quantity of light emitted from the light emitters. Since the organic EL elements can be statically controlled, a control system of the line head can be simplified. The organic EL element 63 is provided in number corresponding to the write width of a single glass substrate 62 in the primary scanning direction. As mentioned above, since organic EL elements are arrayed on the glass substrate 62, the organic EL element array 61 can be fabricated through the same process, and manufacturing cost can be curtailed.

The holder 60 covers the circumference of the substrate 62, and a face of the holder 60 opposing the image carrier 20 shown in FIG. 1 is opened. Thus, a light beam is emitted from the graded-index rod lens 84 to the image carrier 20. A light absorptive member (paint) is applied over the face of the holder 60 opposing the end face of the substrate 62. The holder 60 serves to fix the SLA 65 to a position corresponding to the substrate 62.

Figure 3:
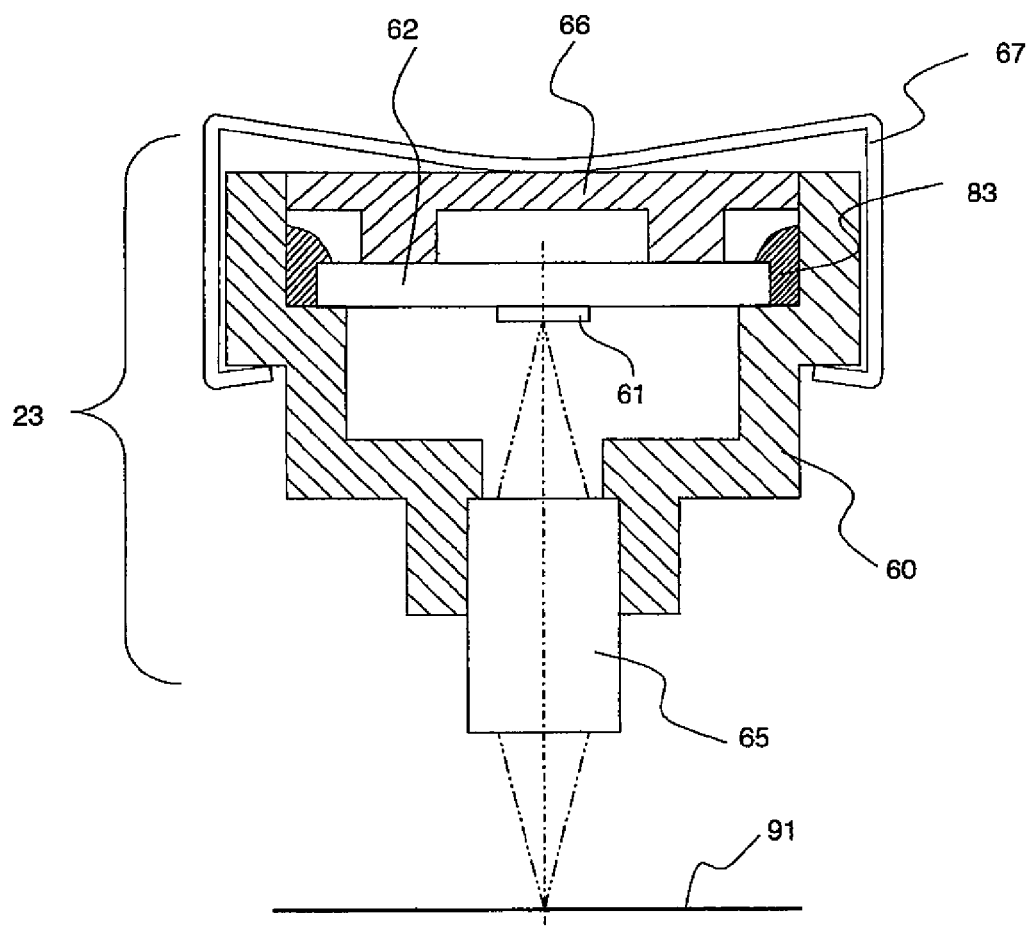
FIG. 3 is a schematic section view of the line head relative to a secondary scanning direction of the image forming apparatus.
Figure 4:
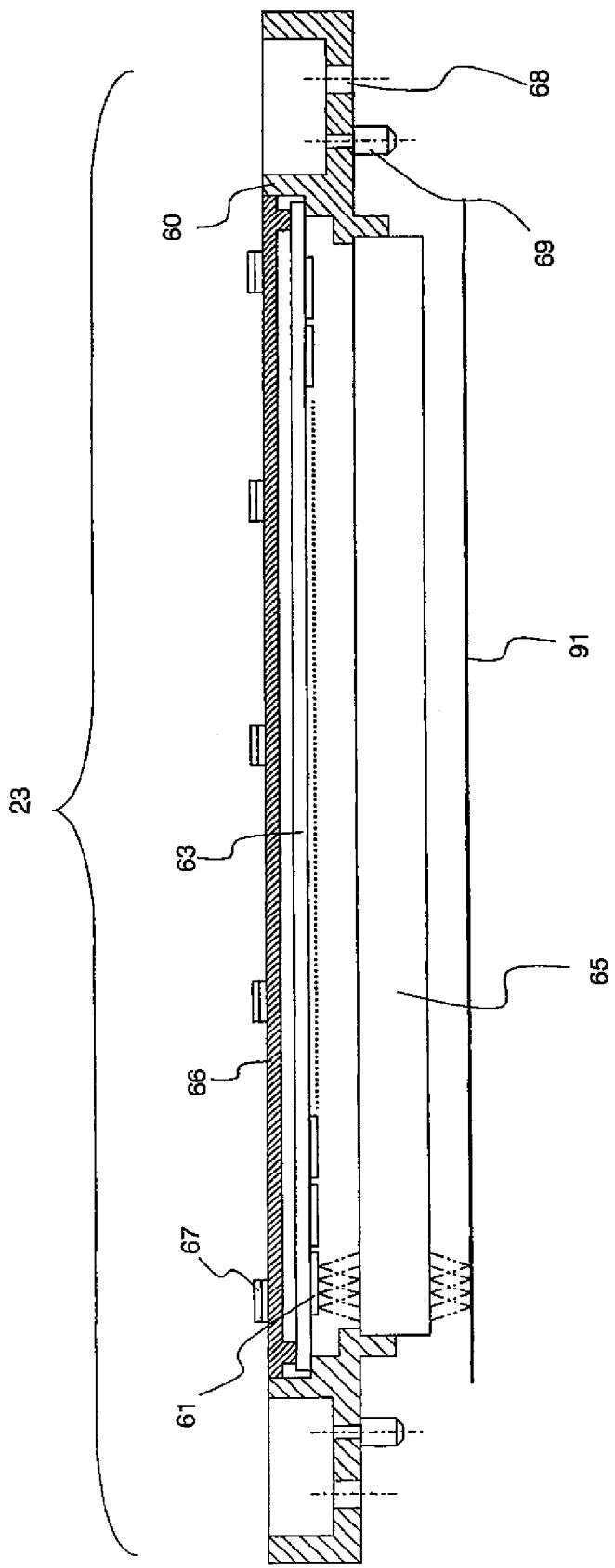
FIG. 4 is a schematic section view of the line head relative to a primary scanning direction of the image forming apparatus.

The secondary scanning direction of the line head 23 is defined as a direction orthogonal to the rotary shaft of the image carrier 20. The primary scanning direction of the line head 23 is defined as a direction parallel to the rotary shaft of the image carrier 20. As shown in FIGS. 3 and 4, the line head 23 is provided with the LED array (or an organic EL element array) 61 attached so as to face the rear face of the graded-index rod lens array 65 in the holder 60; and an opaque cover 66 for shielding the LED array 61 in the holder 60 from the back thereof. The cover 66 is pressed against the back of the holder 60 by a fixed leaf spring 67, thereby sealing the inside of the holder 60 in a light-tight manner. Specifically, the substrate 62 is optically sealed by the holder 60 with use of the fixed leaf spring 67.

The fixed leaf spring 67 is provided at a plurality of locations along the longitudinal direction of the holder 60. Reference numeral 91 designates an image plane (a plane to be exposed) formed on the image carrier, and reference numeral 83 designates an adhesive for fixing the substrate 62 to the holder 60. As mentioned previously, the line head is fixed to the case by use of the holes 68 and the reference pins 69.

Figure 5:
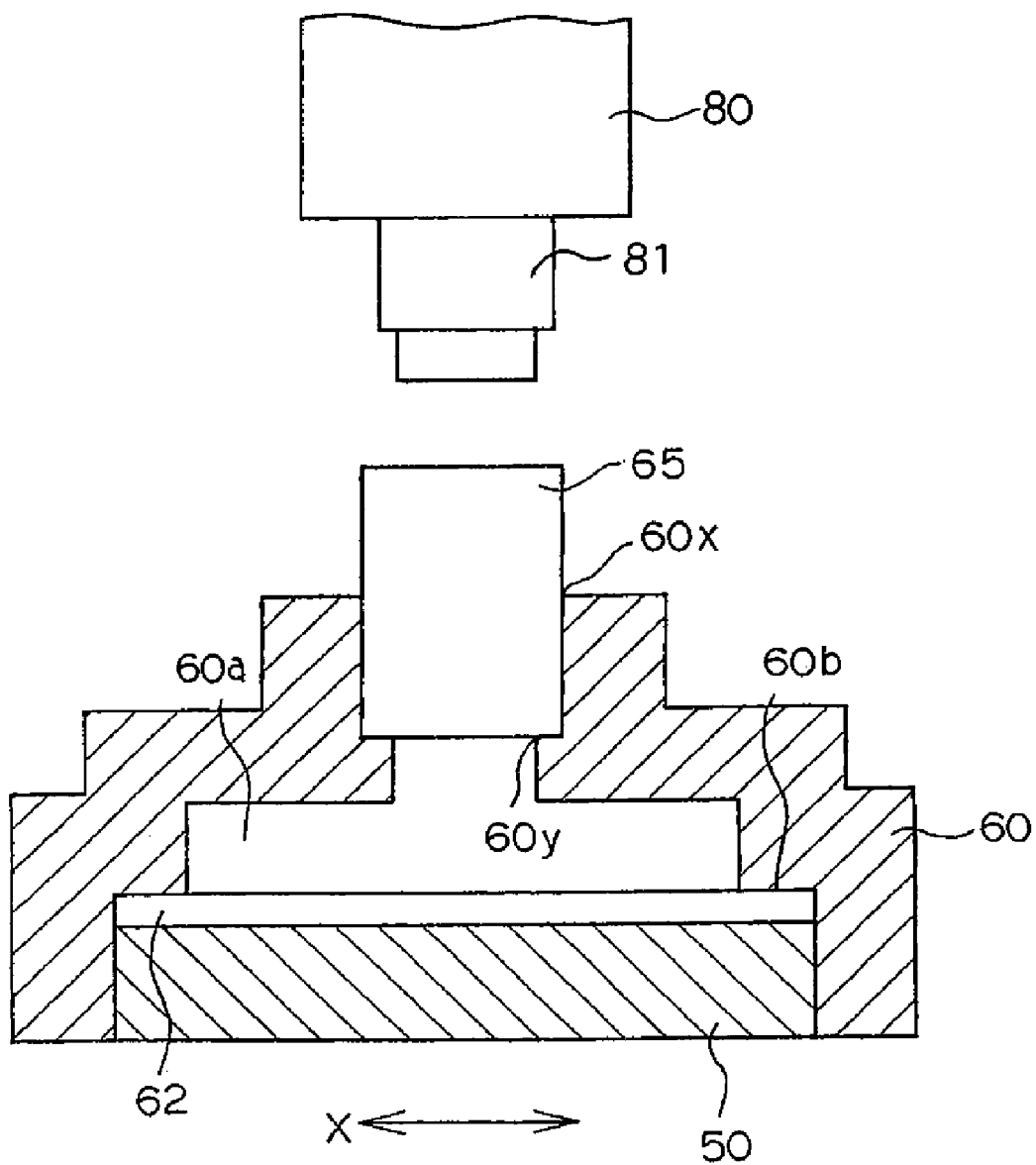
FIG. 5 is a schematic section view for explaining how to adjust a position of the line head, relative to the secondary scanning direction.

The basic principle of positional adjustment of the line head of the present invention will now be described. In FIG. 5, the plurality of light emitters 63 (LEDs or organic EL elements), which are omitted from the figure, are formed on the substrate 62. The light emitters are activated, and the position of the substrate 62 is adjusted and moved in the direction of arrow X (i.e., the secondary scanning direction) by observation through use of a CCD camera 80 such that the scan line connecting the light spots becomes parallel to a line connecting the reference pins 69 provided on respective ends of the primary scanning direction of the line head. Reference numeral 81 designates a magnifying optical system of the CCD camera 80. Reference numeral 50 designates a mounting for holding the substrate 62 thereon to stably attach the same to the holder 60.

Figure 6A:
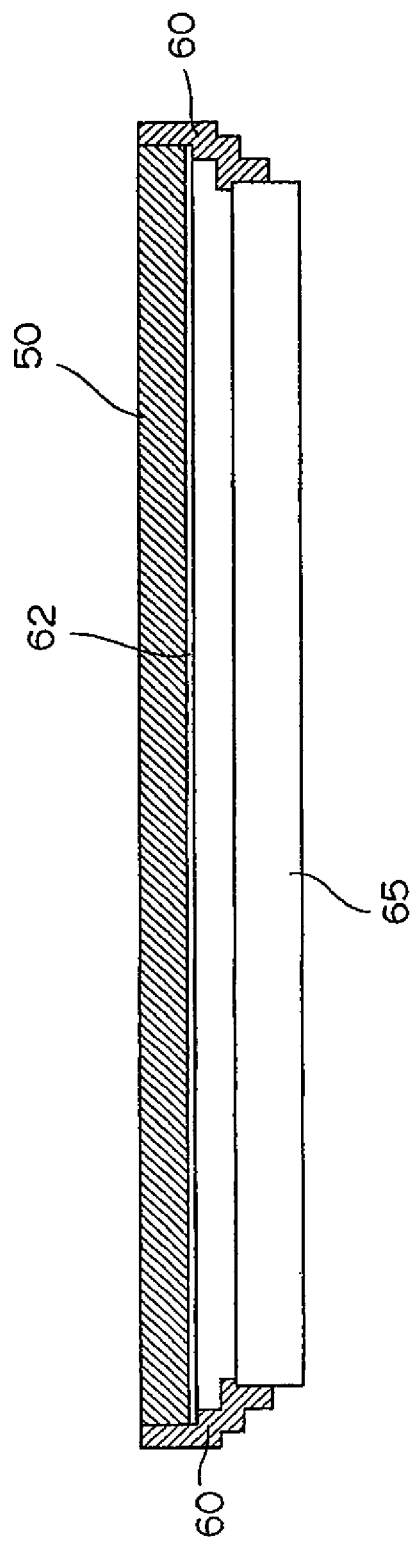
FIG. 6B is a plan view for explaining how to adjust the position of the line head.
Figure 6B:
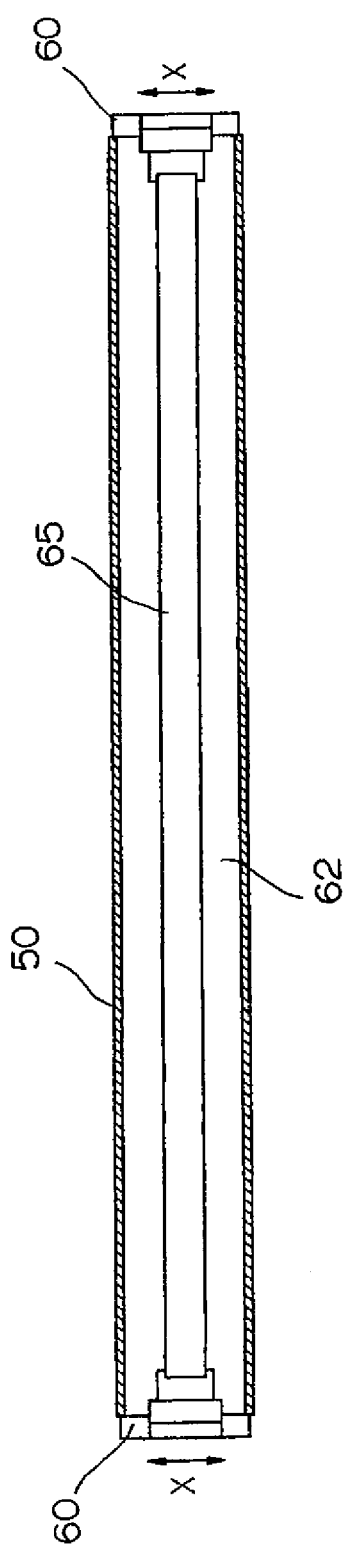

Next, the positioning procedures will be described with reference to FIGS. 5 through 6B. (1) The mounting 50 and the substrate 62 are fixed together by an adhesive. (2) The SLA 65 is inserted into an hole 60x of the holder 60, and is placed on and fixed to a step section 60y. (3) The mounting 50 is inserted into the hole 60a of the holder 60, and attached to the step section 60b in a latched matter. At this time, slight clearance exists between the mounting 50 and the holder 60 in the secondary scanning direction.

(4) The image of the substrate 62 is captured by a CCD camera 80 through the SLA 65. A state achieved by observing the substrate 62 with the CCD camera 80 corresponds to a plan view shown in FIG. 6B. (5) The light emitter (an LED or an organic EL element) is caused to illuminate, and the image of the substrate 62 is captured by the CCD camera 80, whereby a positional displacement between the scan line connecting the light spots and the line connecting the reference pins 69 provided on respective sides of the line head is observed. (6) At least one of the mounting 50 and the holder 60 is moved in the secondary scanning direction (the direction X), to thus adjust the positional deviation. Positioning is carried out such that the scan line connecting the light spots becomes parallel to the line connecting the reference pins 69 provided on the respective ends of the line head in the primary scanning direction thereof. (7) The mounting 50 is held to the holder 60 by appropriate means, such as the adhesive 83 shown in FIG. 3. (8) The holder 60 is attached to the casing of the line head.

In the image forming apparatus of the present invention, the process cartridge is a consumable, and the user can removably attach the process cartridge. Therefore, the configuration of removably inserting a cartridge in the axial direction of the photosensitive member is useful in terms of operability. However, in such a configuration, difficulty is encountered in positioning both ends of the shaft of the photosensitive member directly on the main body of the image forming apparatus (printer). Consequently, the photosensitive member is inevitably supported once by the cartridge and attached to the main body of the printer.

In each of the respective photosensitive members having the above configuration, the primary transfer section and the writing section employing the line head are positioned so as to oppose each other at essentially a 180-degree angle. Consequently, when the shaft of the photosensitive member is inclined within the plane of a belt face of the intermediate transfer belt, the inclination of the image becomes twice. There are two cases: a case where the photosensitive member is positioned above the intermediate transfer medium, and a case where the photosensitive member is positioned below the same. In any event, as mentioned above, the transfer section for the intermediate transfer medium and the writing section are positioned so as to oppose at essentially a 180-degree angle with respect to the rotary shaft of the photosensitive member.

A specific example of correction of skewing of the line head will now be described by reference to FIGS. 7 through 9. As shown in FIG. 8, the substrate (or the glass substrate) 62 is provided with a plurality of light emitters (LEDs or organic EL elements) 63. When the light emitter 63 is an LED, an LED chip array 76 is formed by integrating tens to 200 light emitters 63. The LED array chip 76 having the previous structure is mounted in numbers on the substrate 62 in the primary scanning direction thereof, to thus form a line head of predetermined length. When the light emitter 63 is an organic EL element, the plurality of organic EL elements 63 are arranged on the glass substrate 62 in the primary scanning direction thereof thereby forming a line head of predetermined length. The mounting 50 shown in FIG. 5 is omitted from the figure for simplicity.

CCD cameras 80 are provided at positions above the respective ends of the line head in the primary scanning direction thereof, and each of the CCD cameras observes a scan line when the position of the line head is adjusted in the secondary scanning direction. The substrate 62 is moved in the direction of arrow Za and inserted into the holder 60.

Figure 7:
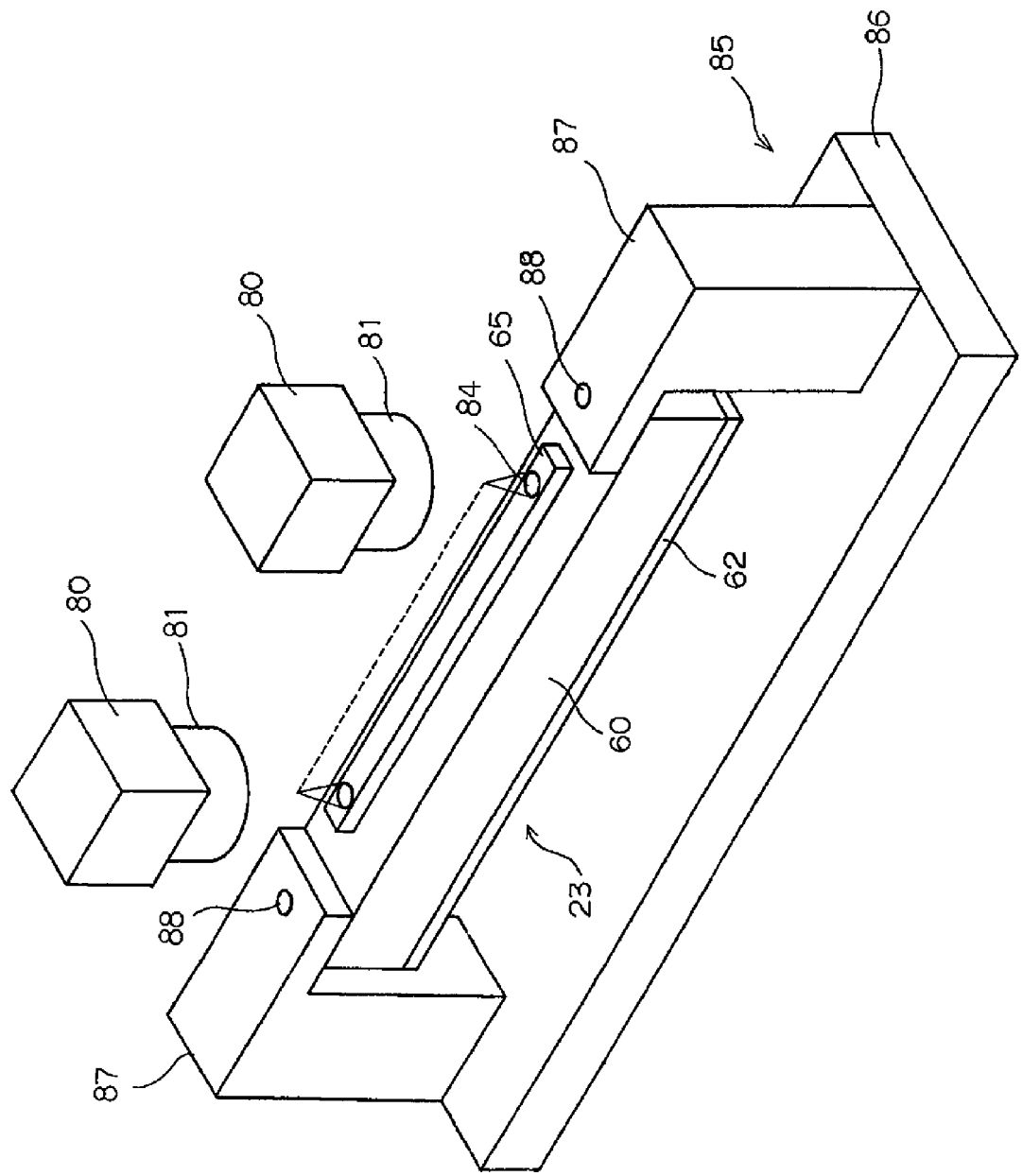
FIG. 7 is a perspective view showing a state that the line head is attached to a position adjustment jig.
Figure 8:
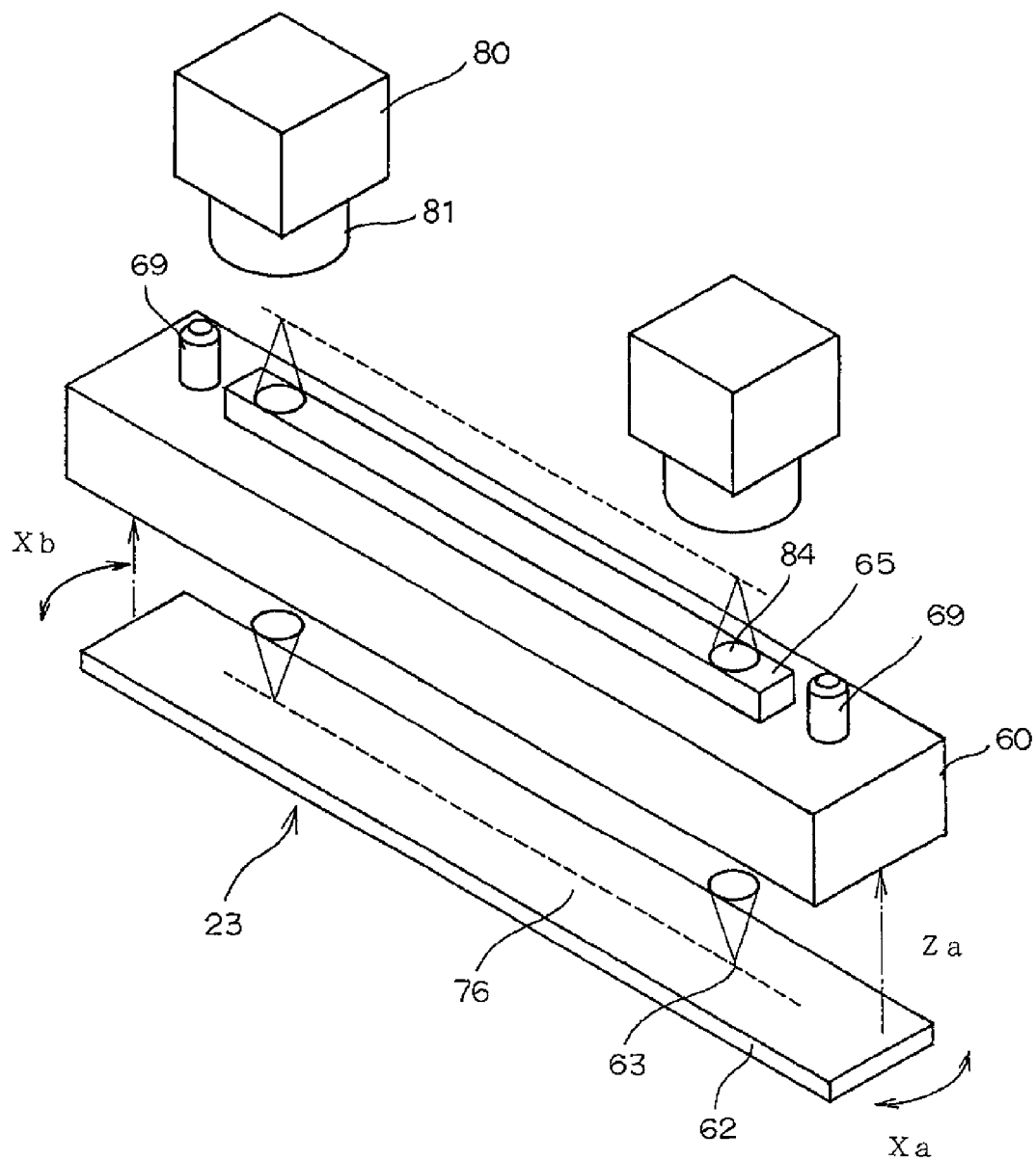
FIG. 8 is a schematic view for explaining how to perform a position adjustment of the line head.

FIG. 7 shows a state that the line head 23 is attached to an adjustment jig 85. Reference numeral 86 designates a base of the adjustment jig 85; and 87 designates L-shaped fixers which are provided on respective sides of the adjustment jig 85 in the primary scanning direction to fix the line head 23. A hole 88 is formed in each of the fixers 87 provided on the respective sides of the adjustment jig 85 in the primary scanning direction, and the reference pins 69 of the line head 23 shown in FIG. 8 are inserted into the holes 88. In the present embodiment, the line head 23 is attached to the adjustment jig 85, and the substrate 62 and the holder 60 are simultaneously subjected to positional adjustment as a single unit. Hence, the necessity for additional positional adjustment of the substrate 62 with respect to the holder 60 is obviated.

In the present invention, at the time of assembly of the LED line head, the position of the scan line formed by arranging the light spots is adjusted such that the scan line becomes parallel to the line connecting the reference pins 69 as described the above. The line head 23 is attached to the adjustment jig 85, and the light emitters (reference pixels) provided on the both end of the light emitter array are illuminated. An image of each of the illuminated light emitters is captured by associated one of the CCD cameras 80 in an enlarged manner. The captured image is observed on the monitor screen, and the substrate 62 is moved in the secondary scanning direction (the direction of Xa and the direction of Xb in FIG. 8) such that the position of a light spot (pixel) comes to a predetermined position, thereby adjusting the position of the line head 23. Such positional adjustment of the line head in the secondary scanning direction corresponds to processing described in connection with FIGS. 5 through 6B. Thus, the position of the line head is adjusted by observing the position of the light spots achieved after transmission of light through the rod lens array 65. Hence, the deviation of the image forming position induced by, e.g., a twist in the rod lens array, can also be adjusted in conjunction with the positional adjustment of the line head.

After positional adjustment of the line head 23, the substrate 62 may also be fastened to the holder 60 by a screw or a UV adhesive as shown in FIG. 3. Positional adjustment involving use of the CCD camera 80 is performed while a monitor screen is being viewed. A scale line showing a position, to which a light spot formed on the monitor screen is to be adjusted, should be superimposed on the monitor screen. Calibration of the scale line is effected by setting a target, serving as a reference, on the adjustment jig 85 in place of the line head; capturing an image of the target by the CCD camera 80; and aligning the scale line to the target. Such an adjustment jig 85 may be embodied by attaching reference pins to a glass mask through use of a tool maker's microscope with high accuracy or by machining a metallic material with high accuracy.

Figure 9:
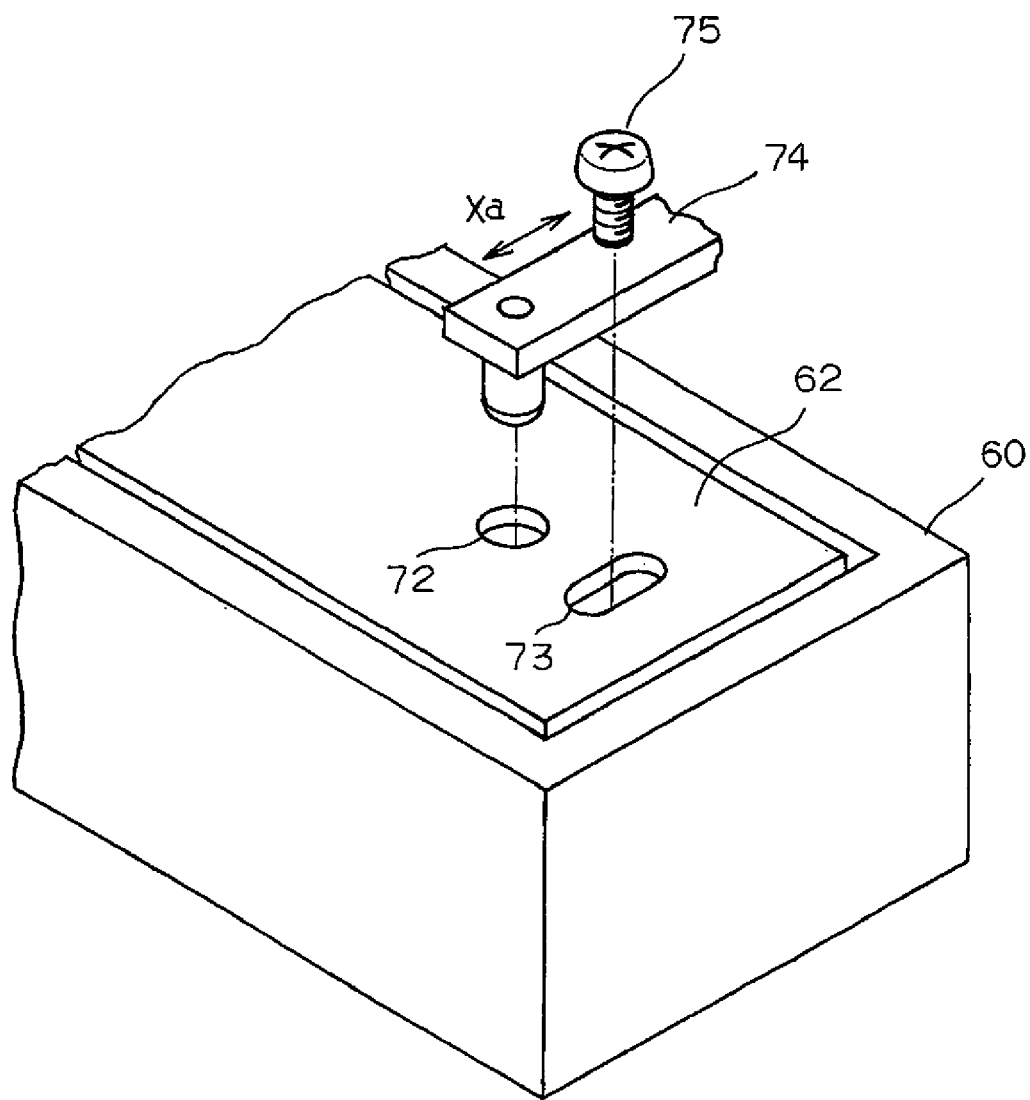
FIG. 9 is a partial perspective view of a jig for adjusting a position of a substrate relative to a holder which are components of the line head.

In this embodiment, as shown in FIG. 9, a hole 72 is formed in the substrate 62 fixed to the holder 60 in order to facilitate movement of the substrate 62 or a mount plate 71 shown in FIG. 10 in the secondary scanning direction. Specifically, a tip end of a movable jig 74 is fitted into the hole 72. The movable jig 74 is moved in the direction of Xa, whereby the line head can be adjusted in the secondary scanning direction. A slot 73 into which a position adjustment pin 75 is to be fitted is formed in the substrate 62.

The position adjustment pin 75 is provided on a mating member (a cartridge or a main body) on which the line head is to be mounted. Consequently, the slot 73 of the substrate 62 is moved in the secondary scanning direction while taking as a reference the position adjustment pin 75 fixed to the mating member, thereby adjusting the position of the line head. Although FIG. 9 shows a configuration in which both of the hole 72 and the slot 73 are provided, either one of the hole 72 and the slot 73 may be provided to perform the same adjustment.

Figure 10A:
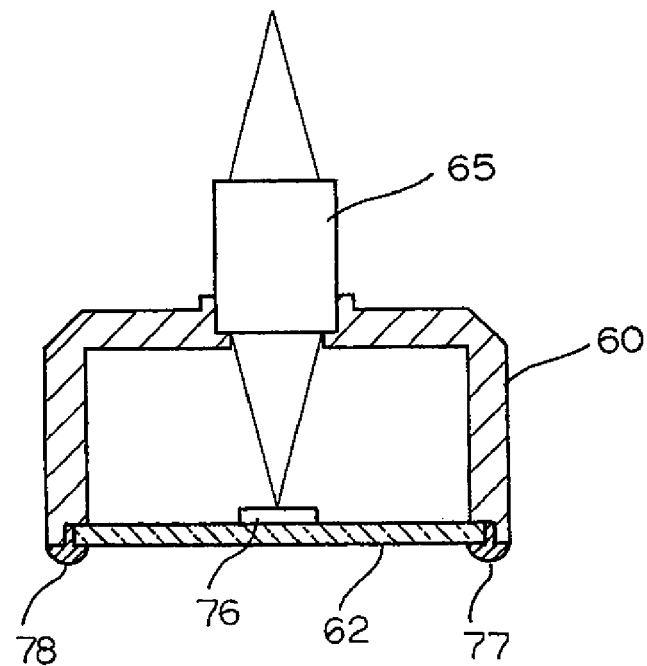
FIGS. 10A and 10B are section views showing how to fix the substrate to the holder.
Figure 10B:
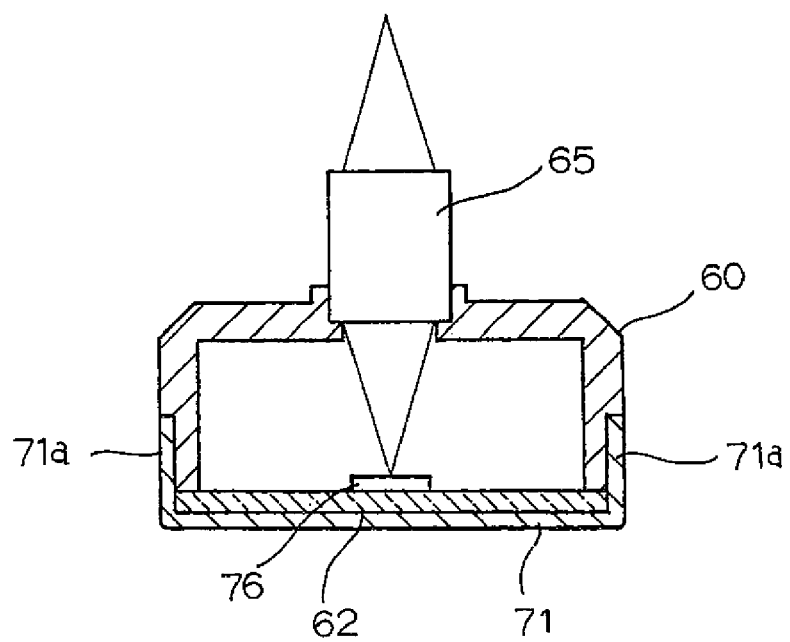

After the substrate 62 and the holder 60 are subjected to positional adjustment as mentioned above, the substrate 62 is fixed to the holder 60 as a single unit. As shown in FIG. 10A, the ends of the substrate 62 in the secondary scanning direction are fastened to the holder 60 by screws 77, 78. As shown in FIG. 10B, the substrate 62 is supported by the mount plate 71, and the mount plate 71 is fastened to the holder 60. The mount plate 71 compensates for deficiencies in the rigidity and accuracy of the substrate 62. Sections 71a on the ends of the mount plate 71 in the secondary scanning direction are vertically bent and fitted to the holder 60. Accordingly, the mount plate 71 is firmly fastened to the holder 60, to thus stably retain the substrate 62. Therefore, even in any of the cases, a screw may also be used when the substrate 62 or the mount plate 71 is fixed to the holder 60, or the screw may be used in combination with an adhesive such as that mentioned above.

In FIGS. 11A to 11C, as well as FIG. 18, reference numeral 69 designates the reference pins provided at the respective ends of the line head in the primary scanning direction thereof, and reference symbol CL designates a line connecting the reference pins provided on the respective ends and corresponds to the center line of the line head along the primary scanning direction. Reference numerals 76a to 76g designate LED array chips arranged in the primary scanning direction of the line head. Each of the LED array chips is provided with a plurality of LEDs.

As mentioned above, in the present embodiment, position adjustment is performed by use of the reference pins 69 provided on the ends of the line head; namely, while taking both end points on the line head as the reference. In a case where the mount position of the LED chip is curved as shown in FIG. 11A, when adjustment is performed while taking only both end points of the line head as the reference, there may also arise a case where the deviation of the intermediate section becomes greater for reasons of the curve. Specifically, as shown in FIG. 11B, a step "db" is formed between the center line CL and the LED array chip 76b.

In such a situation, adjustment may be performed, as shown in FIG. 11C, in such a way that a point A of the LED array chip 76a, a point C of the LED array chip 76f, a point B of the LED array chip 76b, and a point D of the LED array chip 76g become equidistant from the reference line (the center line CL), whereby the total amount of deviation from the reference line can be reduced. Namely, the step "dc" can be made small.

In other words, in addition to the points A and D located in both ends of the line head in the primary scanning direction, a point B which is furthest from the center line CL in one side and a point C which is furthest from the center line CL in the other side are taken into consideration.

Next, a second embodiment of the present invention will now be described. Components similar to those in the first embodiment are designated by the same reference characters and repetitive explanations for those will be omitted. Also in this embodiment, either an LED or an organic EL element may also be used as the light emitter. However, a case where an organic EL element is used will be described as an example.

Figure 12:
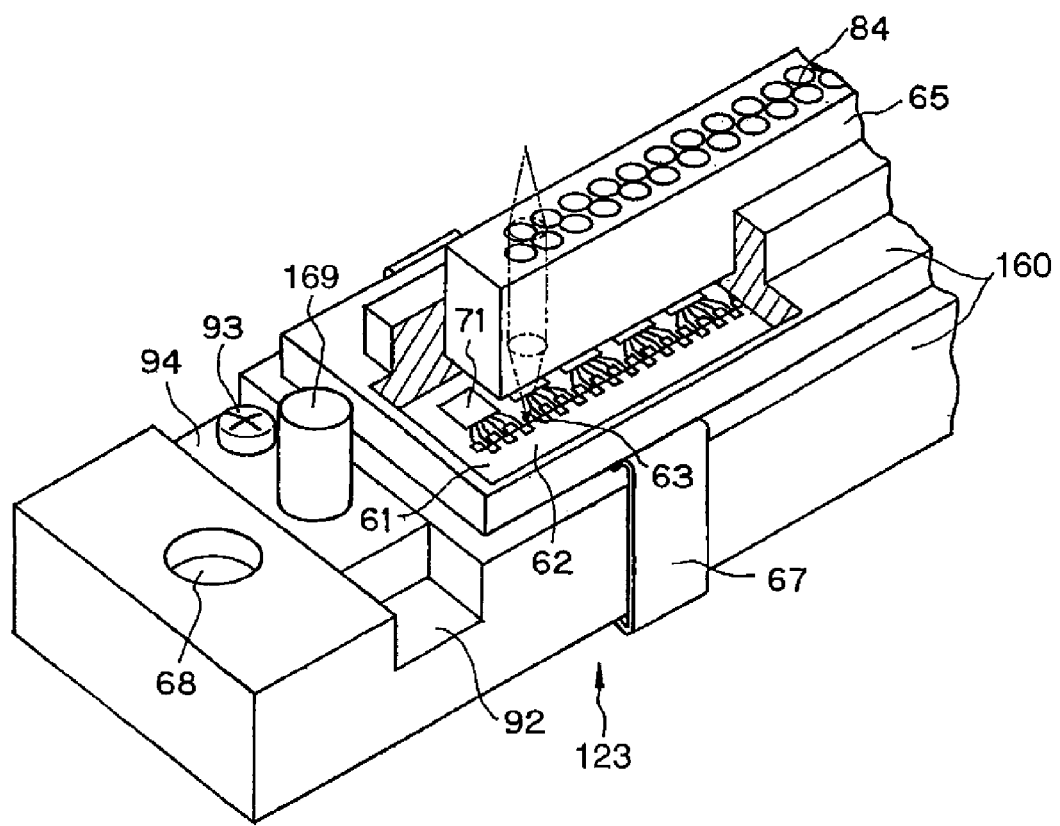
FIG. 12 is a partial perspective view of a line head according to a second embodiment of the invention.
Figure 13:
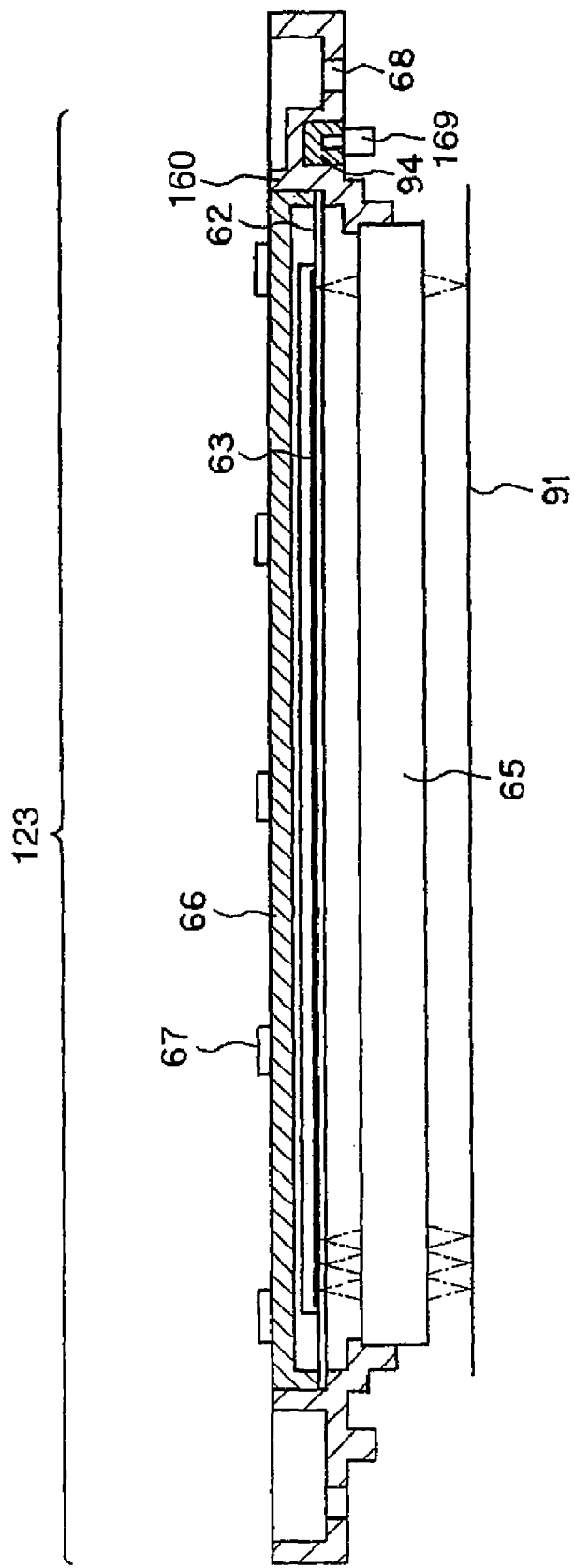
FIG. 13 is a section view of the line head shown in FIG. 12 relative to the primary scanning direction.

As shown in FIGS. 12 and 13, the glass substrate 62 carrying the light emitters (organic EL elements) 63 is held in an elongated housing (holder) 160. Reference pins 169 provided at the ends of the holder 160 are fitted into corresponding mating positioning holes of a casing. Fixing screws are inserted into and fastened to tapped holes of the mating casing via holes 68 formed in the respective ends of the holder 160, whereby the respective image writer 123 are fixed to predetermined positions. The reference pins 169 is provided on the movable member 94 which moves within the groove 92, and the position of the movable member 94 is fixed with a screw 93 after positional adjustment, as will be described later. As mentioned previously, the line head is fixed to the mating case by use of the holes 68 and the reference pins 169. As shown in FIG. 13, one of the reference pins 169 provided on the sides of the line head is provided on a movable member 94, so that the reference pin 169 can be moved in the secondary scanning direction.

Figure 14:
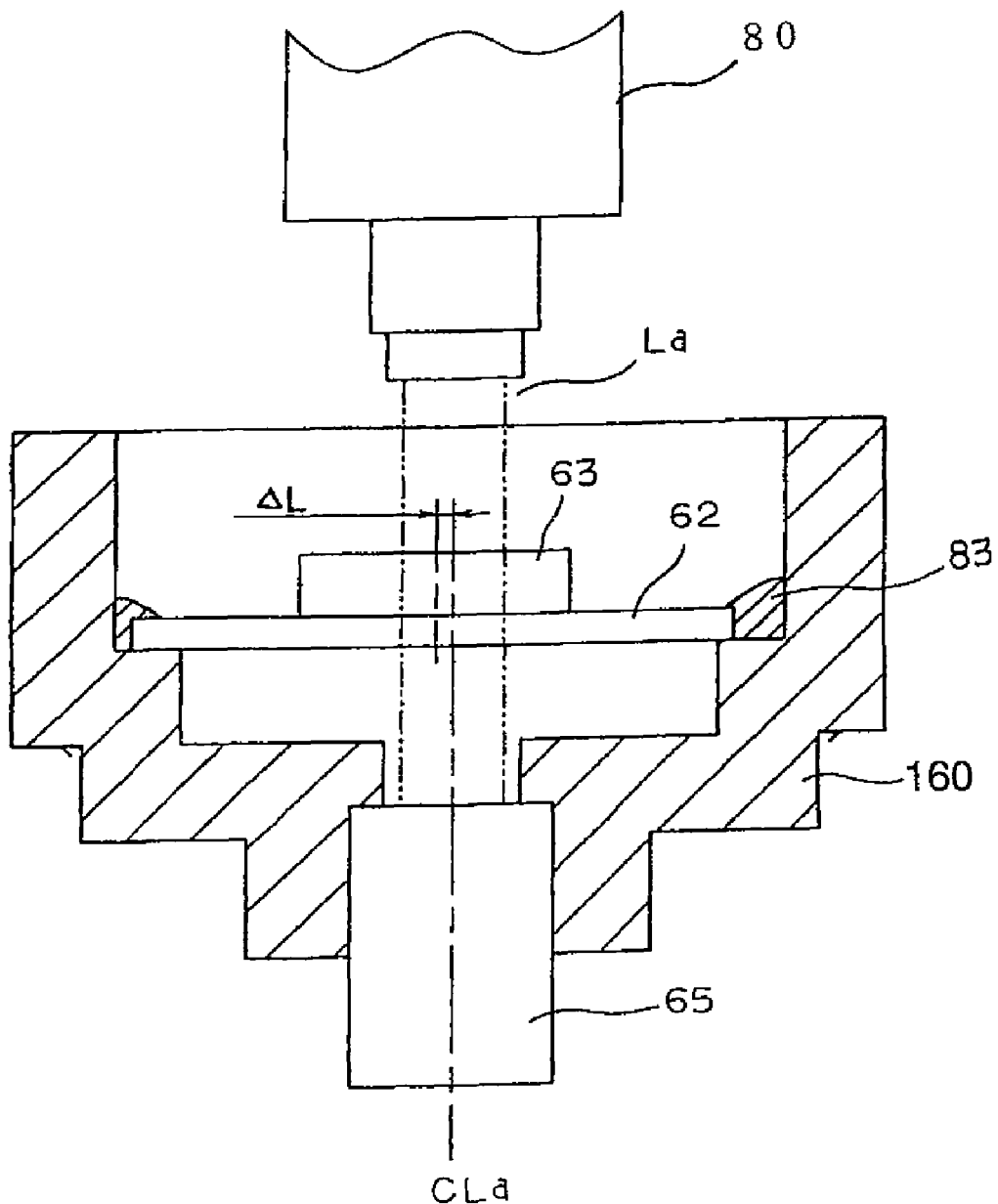
FIG. 14 is a schematic section view for explaining how to perform a position adjustment of the line head of FIG. 12.

Positional adjustment in this embodiment is described with reference to FIG. 14. The rod lens array (SLA) 65 is held by the housing 160, and the glass substrate 62 is fastened to the housing 160 after positional displacement has been adjusted, by the adhesive 83. When the center line of the rod lens array is taken as CLa, the center positions of the light emitters 63 (i.e., the scan line connecting light spots) formed on the glass substrate 62 are assumed to deviate from the center line of the rod lens array by ΔL. This positional deviation ΔL is detected by the CCD camera 80. Reference symbol La designates an optical path of the CCD camera 80. The position of the line head is adjusted such that the scan line connecting the light spots becomes parallel to CLa. When sufficient relative accuracy can be ensured with regard to the glass substrate 62 and the SLA 65, adjustment such as that illustrated in FIG. 14 is obviated.

Figure 16:
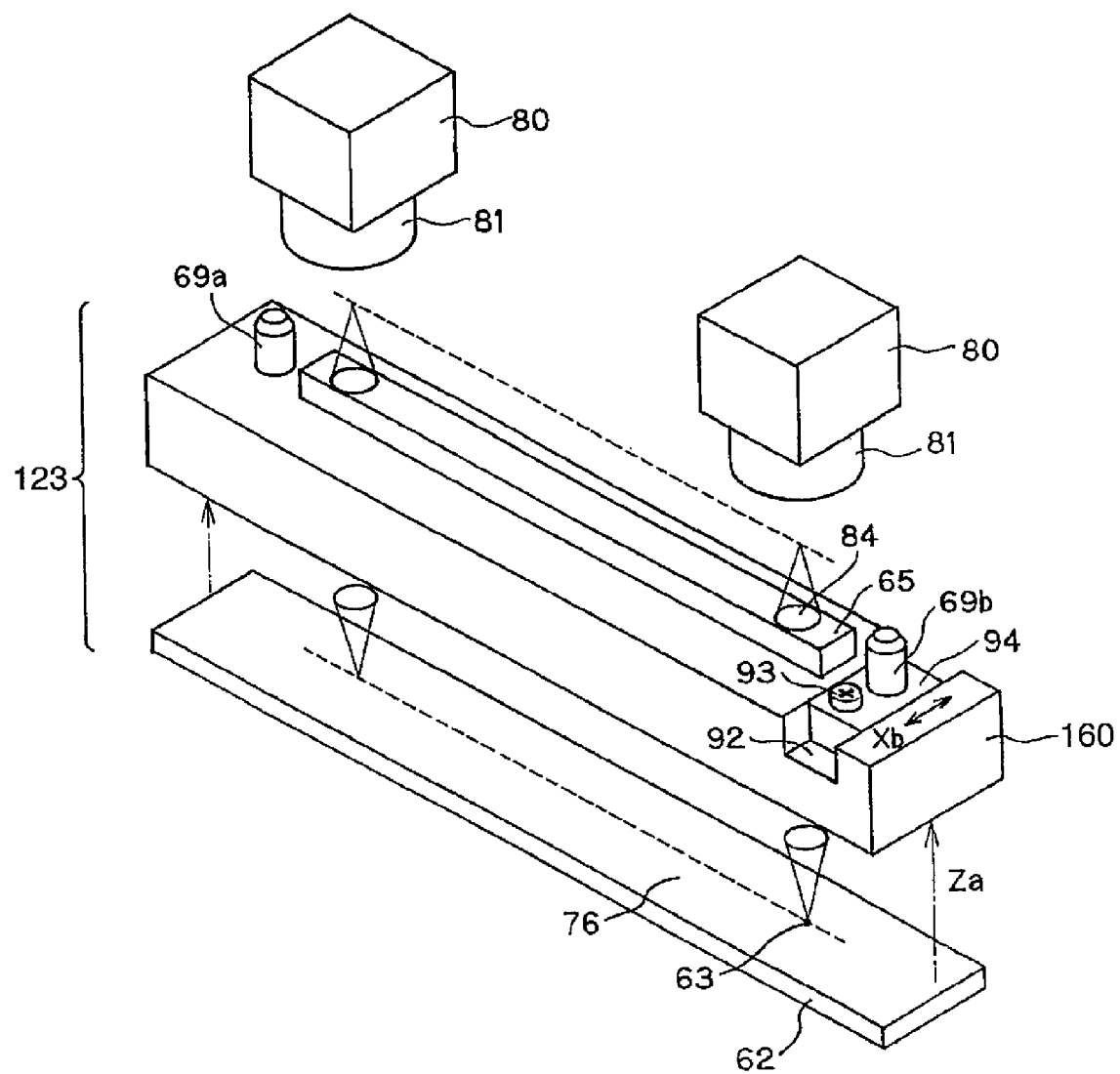

Specific example adjustment of skewing of the line head of the present embodiment will now be described. In FIG. 16, the glass substrate 62 is provided with the plurality of light emitters (organic EL elements) 63. The plurality of organic EL elements 63 are arranged on the glass substrate 62 in the primary scanning direction, thereby forming a line head of predetermined length. The mounting 50 shown in FIG. 5 is omitted from the figure for the sake of simplicity.

One reference pin 69b is provided on the movable member 94 which can be moved in the secondary scanning direction (i.e., the direction of arrow Xb) within a groove 92. After positional adjustment, the position of the movable member 94 is fixed by screw 93. Namely, the position of the line head is adjusted and fixed.

As in the case of the first embodiment, the reference pins 69a, 69b of the line head 123 shown in FIG. 16 are inserted into the holes 88 in the adjustment jig 85 shown in FIG. 7.

Next, the light emitters (reference pixels) provided on the both end of the light emitter array are illuminated. An image of each of the illuminated light emitters is captured by associated one of the CCD cameras 80 in an enlarged manner. The captured image is observed on the monitor screen, and the reference pin 69b is moved in the secondary scanning direction such that the position of the pixel where the image has been formed comes to a predetermined position, thereby adjusting the position of the line head 123.

Figure 15:
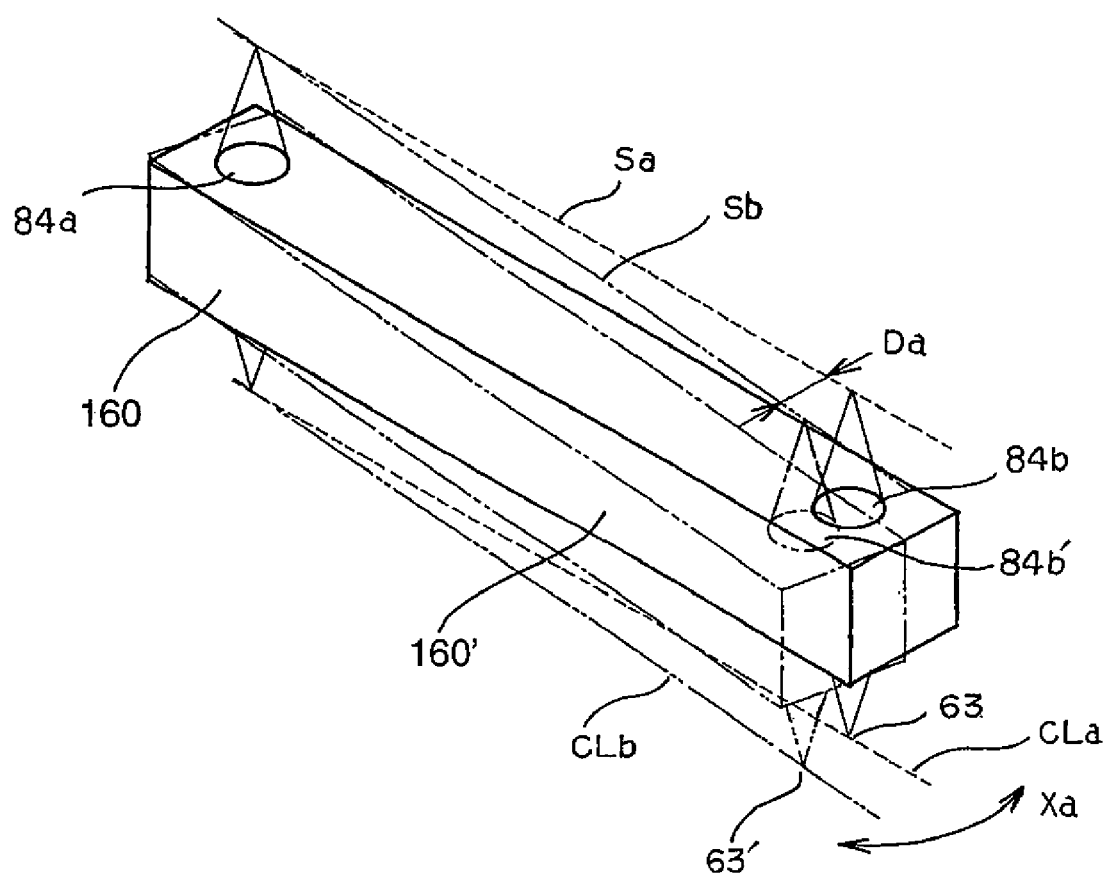
FIGS. 15 and 16 are schematic perspective views for explaining how to perform the position adjustment of the line head of FIG. 12.

That is, as shown in FIG. 15, the position of the holder 160 for the SLA 65 is adjusted by fixing the reference pin 69a omitted from the drawings, and pivoting the reference pin 69b provided on the other end in the secondary scanning direction (the direction of arrow Xa). For the sake of simplicity, FIG. 15 shows only the light beams 84a, 84b of the SLA 65. Reference symbol Sa designates a scan line connecting the light spots achieved before movement of the reference pin 69b, and Sb designates a scan line connecting the light spots achieved after movement of the reference pin 69b. The scan line is moved in the secondary scanning direction by an amount Da. By the movement of the reference pin 69b, the light beam 84b provided at one end of the line head is moved to a position 84b'. Likewise, the light emitter 63 is moved to a position 63', whereby the center line CLa connecting the light emitters provided at the respective ends is moved to CLb. Alternatively, positional adjustment may be performed by fixing the reference pin 69b and pivoting the reference pin 69a in the secondary scanning direction.

As mentioned above, in the present embodiment, the position of the line head is adjusted by observing the position of an light spot achieved after light has passed through the rod lens array. Hence, displacement of the image forming position attributable to a twist in the rod lens array can also be adjusted in conjunction with positional adjustment of the line head. When the light emitting elements of the organic EL elements are greater in width than a pitch between the organic EL elements, the light emitting elements are arranged in two rows of staggered pattern in the secondary scanning direction. In this case, positional adjustment is performed such that the center lines of the two rows of light emitting elements become parallel to the line connecting the reference pins provided at the respective ends.

Also in this embodiment, positional adjustment of the substrate 62 can be performed by the configuration shown in FIG. 9.

After positional adjustment of the line head 23, the glass substrate 62 may also be fastened to the holder 160 by a screw or bonded by a UV adhesive as shown in FIG. 3. Further, as shown in FIG. 10, after the substrate and the holder have been subjected to positional adjustment as a single unit, the substrate is fixed to the holder.

When the line head is configured by arranging a plurality of LED array chips on the substrate in the primary scanning direction thereof positional adjustments shown in FIGS. 11B and 11C are applicable as in the first embodiment.

In the present invention, since the rod lens array is an erecting optical system, displacement or curving of the image forming position, which would otherwise be caused by deviation or bending of the rod lens array in the secondary scanning direction, can be prevented. However, when the rod lens array is twisted, the image forming position is also displaced accordingly, which in turn causes an inclination of the scan line. In the present invention, adjustment is performed by observing an actual image forming position. Hence, by the above-described positional adjustment, the displacement of the image forming position can be absorbed in conjunction with an error due to a twist in the rod lens array.

Parallelism between a reference plane on which the rod lens array is to be mounted and the reference line formed by connecting the reference pins 69 (69a, 69b) is determined by machining with extremely high accuracy. Therefore, even when the position of the substrate 62 having the light emitting elements mounted thereon is adjusted while the reference pin 69 (or one of the reference pins 69a, 69b) is taken as a reference as mentioned above, the relative accuracy of the light emitters and the rod lens array can be resultantly ensured.

Figure 17:
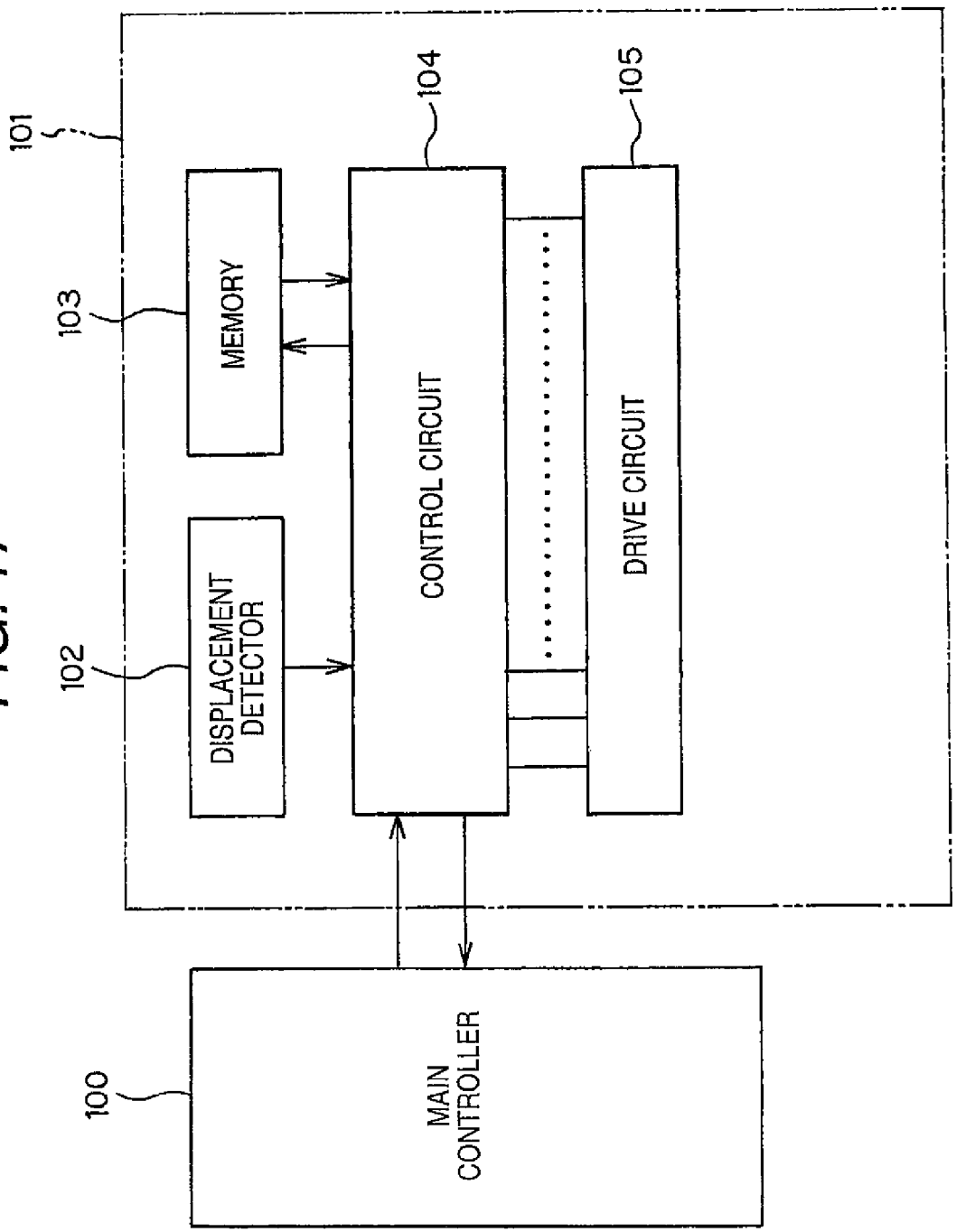
FIG. 17 is a block diagram showing a configuration of a controller for performing the position adjustment of the line head.

In the present invention, the skew correction circuit is basically obviated. However, in order to enhance the accuracy of skew correction, there may be a case where a skew correction circuit is used in an auxiliary manner. FIG. 17 shows a configuration of a controller 101 of such a position adjuster. Reference numeral 102 designates a displacement detector for detecting the positional displacement of the line head; 103 designates a memory; 104 designates a control circuit; and 105 designates a drive circuit. The displacement detector 102 uses a sensor such as a CCD camera 80 shown in FIG. 7. Reference numeral 100 designates a main controller. As mentioned previously, the displacement detector 102 captures an image of the scan line connecting the light spots and an image of the line connecting the reference pins 69 (69a, 69b); and stores image-capturing results.

The control circuit 104 reads the data from the memory 103, and computes the amount of positional displacement corresponding to a difference. The control circuit 104 transmits a signal to the drive circuit 105, to thus control the drive circuit 105 such that the amount of positional displacement is corrected; namely, skew correction is performed. In such a case where the control section 101 is used, the inclination of the scan line attributable to the internal accuracy of the line head is very small, and hence the range of skew correction control becomes smaller. The volume of memory 103 required for skew correction may be small.

As mentioned above, the only challenge to be met by the present invention is to adjust parallelism between the reference line formed by connecting the reference pins provided on the respective ends of the line head and the line of arrangement (scan line) of light spots formed by conversion of light beams from the light sources. An error in absolute distance in the secondary scanning direction is disregarded. The reason for this is that, in a color image forming apparatus (printer), writing positions of respective colors in the secondary scanning direction can be freely adjusted by changing the writing timing. Further, since another error factor of the printer main body is also present, the function of correcting an error in absolute distance in the secondary scanning direction is inevitably provided. Therefore, the line head does not need to manage accuracy of the absolute distance.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application Nos. 2005-263273 filed Sep. 12, 2006, 2005-263274 filed Sep. 12, 2006 and 2005-264629 filed Sep. 13, 2006 including specifications, drawings and claims are incorporated herein by reference in their entirety.

What is claimed is:

1. A method of adjusting a position of a line head comprising: a substrate; a plurality of light emitters, arrayed on the substrate in a first direction, each of which is operable to emit a light beam; a rod lens array, in which a plurality of rod lenses are arrayed in the first direction, and each of the rod lenses is adapted to focus the light beam emitted from an associated one of the light emitters onto a target surface; a holder, to which the substrate and the rod lens array are attached, the holder being elongated in the first direction; and positioning members, provided at both end portions of the holder in the first direction, wherein the substrate and the holder are movable in a second direction perpendicular to the first direction, wherein the method comprises:
   observing focused light spots formed by light beams emitted from at least two of the light emitters, thereby defining a first line connecting the focused light spots;
   defining a second line connecting the positioning members; and
   positioning at least one of the substrate and the holder such that the first line is made parallel with the second line.

2. The method as set forth in claim 1, further comprising:
   integrating the substrate and the holder before the positioning of at least one of the substrate and the holder is performed.

3. The method as set forth in claim 1, further comprising:
   integrating the substrate and the holder after the positioning of at least one of the substrate and the holder is performed.

4. The method as set forth in claim 1, further comprising:
   adjusting a relative position between the holder and at least one of the positioning members.

5. The method as set forth in claim 1, wherein:
   the focused light spots are formed by the light beams emitted from the light emitters located at both end portions of the substrate in the first direction.

6. The method as set forth in claim 1, wherein:
   a first one of the focused light spots is formed by the light beam emitted from one of the light emitters located furthest from the second line in the second direction at one side of the second line; and
   a second one of the focused light spots is formed by the light beam emitted from one of the light emitters located furthest from the second line in the second direction at the other side of the second line.

7. The method as set forth in claim 1, wherein:
   the light emitters are organic EL elements.

8. The method as set forth in claim 1, wherein:
   the light emitters are LEDs; and
   a plurality of LED array chips each of which is provided with the LEDs arrayed in the first direction are arrayed on the substrate in the first direction.

9. A method of adjusting a position of a line head comprising: a substrate; a plurality of light emitters, arrayed on the substrate in a first direction, each of which is operable to emit a light beam; a rod lens array, in which a plurality of rod lenses are arrayed in the first direction, and each of the rod lenses is adapted to focus the light beam emitted from an associated one of the light emitters onto a target surface; a holder, to which the substrate and the rod lens array are attached, the holder being elongated in the first direction; and positioning members, provided at both end portions of the holder in the first direction, wherein the positioning members are movable in a second direction perpendicular to the first direction, wherein the method comprises:

observing focused light spots formed by light beams emitted from at least two of the light emitters, thereby defining a first line connecting the focused light spots;

defining a second line connecting the positioning members; and positioning the positioning members such that the first line is made parallel with the second line.

10. The method as set forth in claim 9, further comprising:
integrating the substrate and the holder before the positioning of at least one of the substrate and the holder is performed.

11. The method as set forth in claim 9, further comprising:
integrating the substrate and the holder after the positioning of at least one of the substrate and the holder is performed.

12. The method as set forth in claim 9, further comprising:
adjusting a relative position between the holder and at least one of the positioning members.

13. The method as set forth in claim 9, wherein:
the focused light spots are formed by the light beams emitted from the light emitters located at both end portions of the substrate in the first direction.

14. The method as set forth in claim 9, wherein:
a first one of the focused light spots is formed by the light beam emitted from one of the light emitters located furthest from the second line in the second direction at one side of the second line; and a second one of the focused light spots is formed by the light beam emitted from one of the light emitters located furthest from the second line in the second direction at the other side of the second line.

* * * * *